United States Patent
Milton et al.

(10) Patent No.: US 10,841,743 B2
(45) Date of Patent: Nov. 17, 2020

(54) BRANCHING MOBILE-DEVICE TO SYSTEM-NAMESPACE IDENTIFIER MAPPINGS

(71) Applicant: PlaceIQ, Inc., New York, NY (US)

(72) Inventors: Stephen Milton, Lyons, CO (US); Duncan McCall, Greenwhich, CT (US)

(73) Assignee: PlaceIQ, Inc., New York, NY (US)

( * ) Notice: Subject to any disclaimer, the term of this patent is extended or adjusted under 35 U.S.C. 154(b) by 152 days.

(21) Appl. No.: 16/017,413

(22) Filed: Jun. 25, 2018

(65) Prior Publication Data

US 2018/0310121 A1 Oct. 25, 2018

Related U.S. Application Data

(63) Continuation of application No. 15/331,845, filed on Oct. 22, 2016, now Pat. No. 10,038,968, which is a
(Continued)

(51) Int. Cl.
*G06F 16/00* (2019.01)
*H04W 4/029* (2018.01)
(Continued)

(52) U.S. Cl.
CPC ........ *H04W 4/029* (2018.02); *G06F 16/9537* (2019.01); *G06Q 30/0269* (2013.01)

(58) Field of Classification Search
None
See application file for complete search history.

(56) References Cited

U.S. PATENT DOCUMENTS 8,990,006 B1 3/2015 Wallace
9,648,116 B2 * 5/2017 Morton ................. H04L 67/306
(Continued)

OTHER PUBLICATIONS

Non-final office action in related U.S. Appl. No. 15/416,711 dated Jan. 24, 2020 (23 pages).
(Continued)

*Primary Examiner* — Debbie M Le
(74) *Attorney, Agent, or Firm* — Pillsbury Winthrop Shaw Pittman, LLP

(57) ABSTRACT

Provided is a process of merging data from feeds from multiple sources of computing device network activity data having heterogenous device identifier namespaces and device identifier to device mappings that change over time, the process including: accessing three or more sources of network activity log data from three or more different sources of network activity data, wherein: for each of the sources of network activity log data, based the respective network activity log data, updating a multi-namespace mapping that maps the external-namespace device identifiers to internal-namespace device identifiers in an internal namespace of a system configured to profile mobile computing devices based on logged network activity data of the mobile computing devices, wherein: the namespace mapping comprises a plurality of external-namespace-specific mappings each mapping a respective type of device identifier in a respective external namespace used in the network activity log data to one or more internal-namespace device identifiers.

23 Claims, 9 Drawing Sheets

Related U.S. Application Data continuation-in-part of application No. 14/334,066, filed on Jul. 17, 2014, now Pat. No. 9,589,280.

(60) Provisional application No. 62/244,767, filed on Oct. 22, 2015, provisional application No. 61/847,083, filed on Jul. 17, 2013, provisional application No. 62/244,768, filed on Oct. 22, 2015.

(51) Int. Cl.
*G06F 16/9537* (2019.01)
*G06Q 30/02* (2012.01)

(56) References Cited

U.S. PATENT DOCUMENTS

| | | | |
|---|---|---|---|
| 10,397,748 B2 * | 8/2019 | Oren | G06Q 30/0255 |
| 10,650,412 B2 * | 5/2020 | Tawakol | H04L 29/0809 |
| 2009/0248680 A1 | 10/2009 | Kalavade | |

OTHER PUBLICATIONS

De Mulder et al., "Identification via location-profiling in GSM networks," WPES'08, Oct. 27, 2008, Alexandria, Virginia, USA.
Madhulatha, T. Soni, "An overview on clustering methods," arXiv preprint arXiv: 1205.1117 IOSR Journal of Engineering, Apr. 2012, vol. 2(4) pp. 719-725.
Noulas et al., "An empirical study of geographic user activity patterns in foursquare," Fifth international AAAI conference on weblogs and social media (2011).

* cited by examiner

US 10,841,743 B2

BRANCHING MOBILE-DEVICE TO SYSTEM-NAMESPACE IDENTIFIER MAPPINGS

CROSS-REFERENCE TO RELATED APPLICATIONS

This patent is a continuation of U.S. patent application Ser. No. 15/331,845, filed on 22 Oct. 2016, titled BRANCHING MOBILE-DEVICE TO SYSTEM-NAMESPACE IDENTIFIER MAPPINGS, which is a continuation-in-part of U.S. patent application Ser. No. 14/334,066, filed 17 Jul. 2014, titled Matching Anonymized User Identifiers Across Differently Anonymized Data Sets, which claims the benefit of U.S. Provisional Patent Application 61/847,083 filed 17 Jul. 2013, titled "Matching Anonymized User Identifiers Across Differently Anonymized Data Sets"; claims the benefit of U.S. Provisional Patent Application 62/244,767, filed 22 Oct. 2015, titled BRANCHING MOBILE-DEVICE TO SYSTEM-NAMESPACE IDENTIFIER MAPPINGS; and U.S. patent application Ser. No. 15/331,845 claims the benefit of U.S. Provisional Patent Application 62/244,768, filed 22 Oct. 2015, titled DETECTING INFLUENCERS IN SOCIAL NETWORKS WITH LOCATION DATA, each of which is incorporated by reference.

BACKGROUND

1. Field

The present disclosure relates generally to user profiles and, more specifically, to generating user profiles based on locations identified by matching anonymized user identifiers across differently anonymized data sets.

2. Description of the Related Art

User profiles are useful in a variety of contexts. For example, advertisers often purchase advertising based on a desire to reach potential customers having particular attributes. Such advertisers often employ user profiles to select when, where, or how the advertiser conveys their message. Similarly, market researchers may analyze user profiles to better understand the market for a given good or service based on attributes of buyers of that good or service. In another example, user profiles may be used to customize products or services, for instance, by customizing a software application according to the profile of a user of the software application, or user profiles may be used by governmental agencies to allocate services to geographic areas according to profiles of users in those areas.

User profiles, however, can be difficult to obtain, as users generally have little incentive to generate a profile of themselves for use by others. Such a task can be tedious and unpleasant. Further, users' recollection of their behavior over time can be unreliable.

Instead, advertisers (and other consumers of user profiles) often rely on user profiles generated based on activities of users on various networks or other distributed systems (e.g., cell carriers, ad networks, native applications on smart phones, etc.). Forming such profiles can be difficult, though, because data from individual sources is often insufficient to reliably profile users and the data is often anonymized.

Frequently, available data identifies users uniquely within a given data provider's system, but does not identify users canonically across multiple data provider systems, as each data provider often has a different unique ID for the same user (e.g., a device of a user). This is typically done to comply with privacy policies of the data providers. But as a result, it is difficult to match a record about a user's device from one data provider with a record about the same user's device from another data provider. Also, when users update their equipment, e.g., with a new cell phone, or when a device identifier for a given device is changed by a data provider, it can be difficult to tie a user's existing profile to data from the new equipment, as the third party user identifiers are often based on identifiers of the equipment (e.g., a data-provider-specific hash of a media access control (MAC) address or an advertiser identification number of the device), or to an existing profile mapped to the older identifier.

SUMMARY

The following is a non-exhaustive listing of some aspects of the present techniques. These and other aspects are described in the following disclosure.

Some aspects include a process of joining data from feeds from multiple sources of computing device network activity data having heterogenous device identifier namespaces and device identifier to device mappings that change over time, the process including: accessing, with one or more processors, three or more sources of network activity log data from three or more different sources of network activity data, wherein: each source of network activity log data describes network activity by more than 100,000 mobile computing devices, each source of network activity log data describes activities over a duration of time longer than one hour, each source of network activity log data provides transaction records of more than one 1 million transactions by at least some of the mobile computing devices, each transaction record including one or more external-namespace device identifiers in an external namespace of a respective mobile computing device participating in the respective network transaction, and the transaction records associate geolocations reported by the mobile computing devices with timestamps and external-namespace device identifiers of the mobile computing devices; for each of the sources of network activity log data, based the respective network activity log data, updating, with one or more processors, a multi-namespace mapping that maps the external-namespace device identifiers to internal-namespace device identifiers in an internal namespace of a system configured to profile mobile computing devices based on logged network activity data of the mobile computing devices, wherein: the namespace mapping comprises a plurality of external-namespace-specific mappings each mapping a respective type of device identifier in a respective external namespace used in the network activity log data to one or more internal-namespace device identifiers, and at least some of the external-namespace device identifiers are mapped in at least some of the external-namespace-specific mappings to a plurality of internal-namespace device identifiers, with a given device external-namespace device identifier being mapped to a given plurality of internal-namespace device identifiers; after updating the multi-namespace mapping, receiving, with one or more processors, an external-namespace device identifier; selecting, with one or more processors, one of the external-namespace-specific mappings based on the external namespace of the received external-namespace device identifier; accessing, with one or more processors, a plurality of internal-namespace device identifiers mapped to the received external-namespace device identifier by the selected external-namespace-specific mapping; and accessing, with one or more processors, a device profile associated with at least some of the plurality internal-namespace device identifiers.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
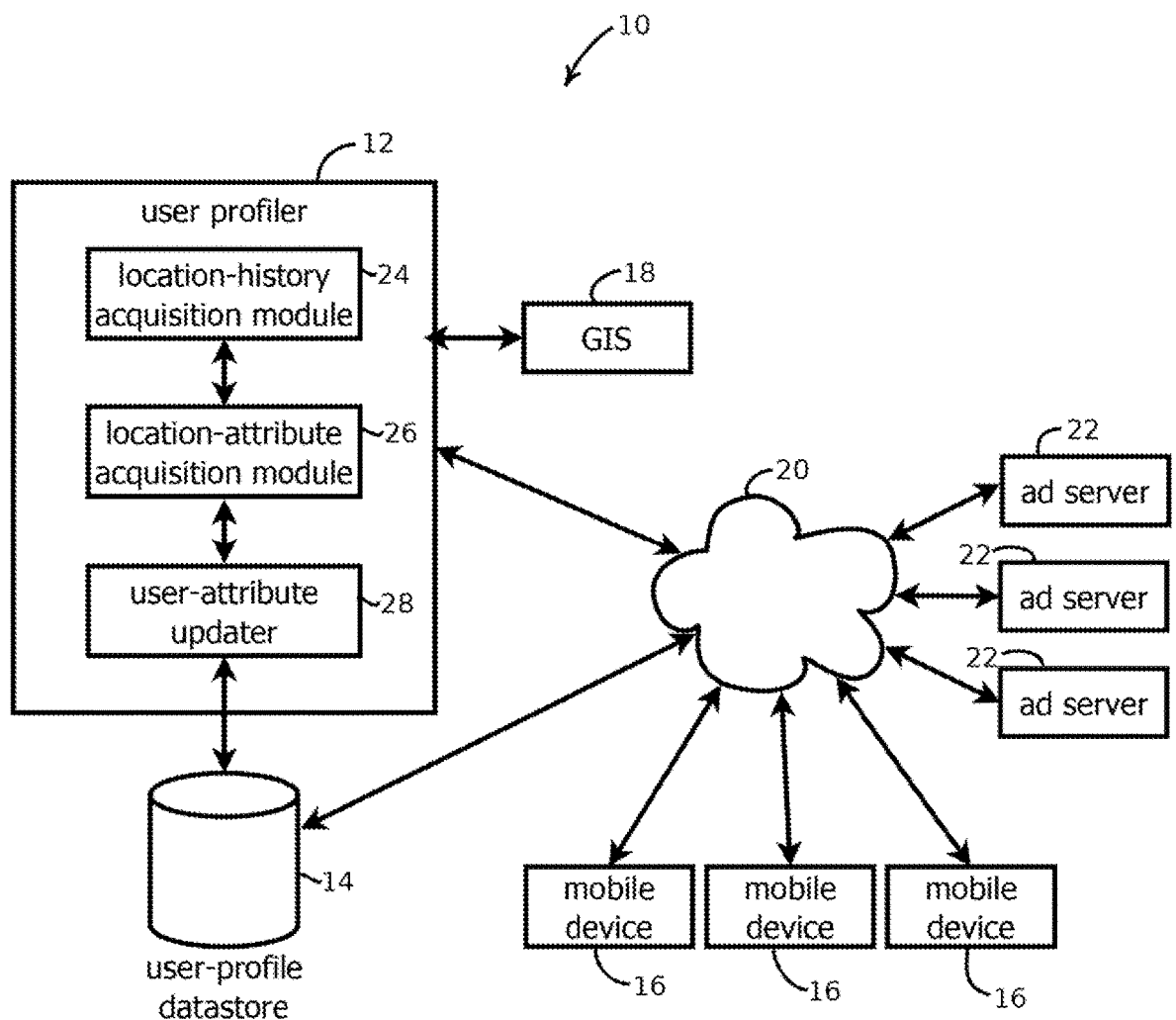
FIG. 1 shows an example of an environment in which a user profiler operates in accordance with some embodiments.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of computer science and geolocation analytics. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Correlating mobile computing device identifiers is a fundamental challenge in the network data analytics industry. The way people use their computing devices on computer networks (e.g., which content they request or view and when and where they use their device) is the bedrock upon which are built many of the statistical inferences driving content recommendation, AI personal assistants, advertisement selection, and many forms of site selection and municipal design. Yet matching records of network usage to devices, in a way that is consistent over time, is a persistent challenge. This is due, in part to the scale of data at issue, often with billions or hundreds of billions of records of network transactions in many data sets. Many computer systems cannot process the relevant analyses at these scales in reasonable run-times. This is also due to changes in the device identifiers over time and different data providers using different identifiers for the same computing device (without indicating correlations therebetween). Due to these challenges, the ability to intelligently manage these namespaces and relationships therebetween is expected to become a key differentiator in driving demand for geolocation analytics systems, as namespace management lies upstream of many analyses that are much more highly valued if based on accurate data.

Below, techniques are described to mitigate these problems. FIGS. 1-4 describe a first set of techniques for profiling places and people; FIG. 5 describes a second set of techniques for dealing with anonymized user (e.g., device) identifiers; and FIGS. 6-7 describe another set of techniques for managing a changing representation of device identifier mappings over time. It should be emphasized that several inventions are described, and that while the inventions can be used synergistically together, they are also independently useful.

FIG. 1 shows an example of a computing environment 10 having a user profiler 12 operative to generate user profiles to be stored in a user-profile datastore 14. In some embodiments, the user profiler 12 generates (for example, instantiates or updates) the user profiles based on location histories from mobile devices 16 and attributes of geographic locations stored in a geographic information system 18. The resulting user profiles may reflect the attributes of the locations visited by users. The location histories may be conveyed via the Internet 20 to remote locations, and the user profiles may be used by advertisement servers 22 to select advertisements for presentation to users or for other purposes described below.

The profiles may characterize a variety of attributes of users. In one illustrative use case, a location history may indicate that a user frequently visits geographic locations associated with tourism, and the profile of that user may be updated to indicate that the user frequently engages in tourism, which may be of interest to certain categories of advertisers. Or a user may spend their working hours in geographic areas associated with childcare and residences, and based on their location history, the profile of that user may be updated to indicate that the user likely engages in childcare for children younger than school age. Other examples are described below.

Further, as explained in detail below, the attributes associated with geographic locations may vary over time (for example, an area with coffee shops and bars may have a stronger association with consumption of breakfast or coffee in the morning, an association which weakens in the evening, while an association with entertainment or nightlife may be weaker in the morning and stronger in the evening). User profiles may be generated in accordance with the time-based attributes that predominate when the user is in a geographic area. And in some embodiments, user profiles may also be segmented in time, such that a portion of a given user's profile associated with a weekday morning may have different attributes than another portion of that user's profile associated with a weekend night, for instance.

The user profiles may be used by advertisers and others in a privacy-friendly fashion, such that users are expected to tend to opt in to sharing their location history. For example, the user profiles may be aggregated to identify geographic areas having a high density of a particular type of user at a particular time of the week, such as a sports stadium having a relatively large number of users associated with fishing as a hobby, or a children's soccer field in which a relatively large number of people associated with golfing as a hobby might tend to co-occur on weekend mornings. Such correlations may be presented to advertisers or others without disclosing information by which individual users can be uniquely identified. In other applications, user-specific information may be provided, for example, users who opt in to sharing their profiles may receive user-specific services or communications formulated based on the individual profile of that user.

Accounting for time when characterizing geographic areas is believed to yield relatively accurate characterizations of places, as the activities that people engage in at a given location tend to depend strongly on time of day and week. And for similar reasons, accounting for time when profiling users is expected to yield relatively accurate characterizations of the users. Generating profiles based on location history further offers the benefit of profiling users without imposing the burden of manually doing so on the users themselves, and using attributes of geographic areas in which the user travels is expected to yield relatively privacy-friendly data about the user. That said, not all embodiments offer all, or any, of these benefits, as various engineering and cost trade-offs are envisioned, and other embodiments may offer other benefits, some of which are described below.

As noted above, the user profiler 12 obtains data from the mobile devices 16 and the geographic information system 18 to output user profiles to the user-profile datastore 14 for use by the ad servers 22 or for other purposes. Accordingly, these components are described in this sequence, starting with inputs, and concluding with outputs.

The mobile devices 16 maybe any of a variety of different types of computing devices having an energy storage device (e.g., a battery) and being capable of communicating via a network, for example via a wireless area network or a cellular network connected to the Internet 20. In some cases, the mobile devices 16 are handheld mobile computing devices, such as smart phones, tablets, or the like, or the mobile devices may be laptop computers or other special-purpose computing devices, such as an automobile-based computer (e.g., an in-dash navigation system). The mobile devices 16 may have a processor and a tangible, non-transitory machine-readable memory storing instructions that provide the functionality described herein when executed by the processor. The memory may store instructions for an operating system, special-purpose applications (apps), and a web browser, depending upon the use case. It should be noted, however, that the present techniques are not limited to mobile devices, and other computing devices subject to geolocation may also generate data useful for forming user profiles. For instance, set-top boxes, gaming consoles, or Internet-capable televisions may be geolocated based on IP address, and data from user interactions with these devices may be used to update user profiles, e.g., with user interaction indicating a time at which a user was at the geolocation corresponding to the device.

This software may have access to external or internal services by which the location of the mobile device may be obtained. For example, the mobile device may have a built-in satellite-based geolocation device (for instance a global-positioning system, or GPS, device or components operative to obtain location from other satellite-based systems, such as Russia's GLONASS system or the European Union's Galileo system). In another example, location may be obtained based on the current wireless environment of the mobile device, for example by sensing attributes of the wireless environment (e.g. SSIDs of wireless hotspots, identifiers of cellular towers and signal strengths, identifiers of low energy Bluetooth beacons, and the like) and sending those attributes to a remote server capable of identifying the location of the mobile device. In some embodiments, the location may be obtained based on an identifier of a network node through which the mobile device connects to the Internet, for example by geocoding an IP address of a wireless router or based on a location of a cellular tower to which the mobile device is connected. The location may be expressed as a latitude and longitude coordinate or an area, and in some cases may include a confidence score, such as a radius or bounding box defining area within which the device is expected to be with more than some threshold confidence.

From time to time, the location of the mobile devices 16 may be obtained by the mobile devices. For example, when a user interacts with a special-purpose application, in some cases, the application may have permission to obtain the location of the mobile device and report that location to a third party server associated with the application, such that the location may be obtained by the user profiler 12 from the third party server. In another example, the user may visit a website having code that obtains the current location of the mobile device. This location may be reported back to the server from which the website was obtained or some other third party server, such as an ad server for an affiliate network, and location histories may be obtained from this server. In another example, locations of the mobile devices 16 may be obtained without the participation of the mobile device beyond connecting to a network. For instance, users may opt in to allowing a cellular service provider to detect their location based on cellular signals and provide that location to the user profiler 12. Depending upon how location is obtained, the location may be acquired intermittently, for example at three different times during a day when a user launches a particular application, or relatively frequently, for example by periodically polling a GPS device and reporting the location. In some cases, the location history may include locations obtained more than one-second apart, more than one-minute apart, more than one-hour apart, or more, depending upon the use case.

Locations may be obtained in real time from mobile devices 16 by the user profiler 12, or in some embodiments, location histories may be obtained, e.g., from third party data providers using the process and systems described below with reference to FIGS. 4-5. Each location history may include records of geographic locations of a given mobile device and when the mobile device was at each location. In some cases, a location history may include records of location over a relatively long duration of time, such as more than over a preceding hour, day, week, or month, as some modes of acquiring location histories report or update location histories relatively infrequently. A location history for a given mobile device may include a plurality (e.g., more than 10 or more than 100) location records, each location record corresponding to a detected location of the mobile device, and each location record including a geographic location and the time at which the mobile device was at the location. The location records may also include a confidence score indicative of the accuracy of the detected location. Geographic locations may be expressed in a variety of formats with varying degrees of specificity, for example as a latitude and longitude coordinates, as tiles in a grid with which a geographic area is segmented (e.g., quantized), or in some other format for uniquely specifying places.

The geographic information system 18 may be configured to provide information about geographic locations in response to queries specifying a location of interest. In some embodiments, the geographic information system 18 organizes information about a geographic area by quantizing (or otherwise dividing) the geographic area into area units, called tiles, that are mapped to subsets of the geographic area. In some cases, the tiles correspond to square units of area having sides that are between 10-meters and 1000-meters, for example approximately 100-meters per side, depending upon the desired granularity with which a geographic area is to be described. In other examples, the tiles have other shapes, e.g., hexagon shapes that are arranged in a two-dimensional hexagonal packing layout.

In some cases, the attributes of a geographic area change over time. Accordingly, some embodiments divide each tile according to time. For instance, some embodiments divide each tile into subsets of some period of time, such as one week, one month, or one year, and attributes of the tile are recorded for subsets of that period of time. For example, the period of time may be one week, and each tile may be divided by portions of the week selected in view of the way users generally organize their week, accounting, for instance, for differences between work days and weekends, work hours, after work hours, mealtimes, typical sleep hours, and the like. Examples of such time divisions may include a duration for a tile corresponding to Monday morning from 6 AM to 8 AM, during which users often eat breakfast and commute to work, 8 AM till 11 AM, during which users often are at work, 11 AM till 1 PM, during which users are often eating lunch, 1 PM till 5 PM, during which users are often engaged in work, 5 PM till 6 PM, during which users are often commuting home, and the like. Similar durations may be selected for weekend days, for example 8 PM till midnight on Saturdays, during which users are often engaged in leisure activities. Each of these durations may be profiled at each tile.

In some embodiments, the geographic information system 18 includes a plurality of tile records, each tile record corresponding to a different subset of a geographic area. Each tile record may include an identifier, an indication of geographic area corresponding to the tile (which for regularly size tiles may be the identifier), and a plurality of tile-time records. Each tile-time record may correspond to one of the above-mentioned divisions of time for a given tile, and the tile-time records may characterize attributes of the tile at different points of time, such as during different times of the week. Each tile-time record may also include a density score indicative of the number of people in the tile at a given time. In some embodiments, each tile-time record includes an indication of the duration of time described by the record (e.g. lunch time on Sundays, or dinnertime on Wednesdays) and a plurality of attribute records, each attribute record describing an attribute of the tile at the corresponding window of time during some cycle (e.g., weekly).

The attributes may be descriptions of activities in which users engage that are potentially of interest to consumers of the user-profile datastore 14. For example, some advertisers may be interested in when and where users go to particular types of restaurants, when and where users play golf, when and where users watch sports, when and where users fish, or when and where users work in particular categories of jobs. In some embodiments, each tile-time record may include a relatively large number of attribute records, for example more than 10, more than 100, more than 1000, or approximately 4000 attribute records, depending upon the desired specificity with which the tiles are to be described. Each attribute record may include an indicator of the attribute being characterized and an attribute score indicating the degree to which users tend to engage in activities corresponding to the attribute in the corresponding tile at the corresponding duration of time. In some cases, the attribute score (or tile-time record) is characterized by a density score indicating the number of users expected to engage in the corresponding activity in the tile at the time.

Thus, to use some embodiments of the geographic information system 18, a query may be submitted to determine what sort of activities users engage in at a particular block in downtown New York during Friday evenings, and the geographic information system 18 may respond with the attribute records corresponding to that block at that time. Those attribute records may indicate a relatively high attribute score for high-end dining, indicating that users typically go to restaurants in this category at that time in this place, and a relatively low attribute score for playing golf, for example. Attribute scores may be normalized, for example a value from 0 to 10, with a value indicating the propensity of users to exhibit behavior described by that attribute.

The user profiler 12 may join the location histories and tile records implicated by locations in those location histories to generate user profiles. Thus, users may be characterized according to the attributes of the places those users visit at the time the user visits those places. The generated user profiles may then be stored by the user profiler 12 in the user-profile datastore 14, as described below. To this end, or others, some embodiments of the user profiler 12 includes a location-history acquisition module 24, a location-attribute acquisition module 26, and a user-attribute updater 28 operative to generate user profiles.

The user profiler 12 may be constructed from one or more of the computers described below with reference to FIG. 9. These computers may include a tangible, non-transitory, machine-readable medium, such as various forms of memory storing instructions that when executed by one or more processors of these computers (or some other data processing apparatus) cause the computers to provide the functionality of the user profiler 12 described herein. The components of the user profiler 12 are illustrated as discrete functional blocks, but it should be noted that the hardware and software by which these functional blocks are implemented may be differently organized, for example, code or hardware for providing the this functionality may be intermingled, subdivided, conjoined, or otherwise differently arranged.

The illustrated location-history acquisition module 24 may be configured to acquire location histories of mobile devices 16 via the Internet 20. The location histories may be acquired directly from the mobile devices 16, or the location histories may be acquired from various third parties, such as a third-party hosting Web applications rendered on the mobile devices 16, third parties hosting servers to which location histories are communicated by apps on the mobile devices 16, or third parties providing network access to the mobile devices 16, such as cellular service providers, for example. The location-history acquisition module 24 may include a plurality of sub-modules for obtaining location histories from a plurality of different providers. These sub-modules may be configured to request, download, and parse location histories from a respective one of the different providers via application program interfaces provided by those providers. The sub-modules may normalize the location histories from the different providers, which may be in different formats, into a common format for use in subsequent processing. Location histories may be acquired periodically, for example monthly, weekly, or hourly, or more frequently.

The user profiler 12 of this embodiment further includes the location-attribute acquisition module 26. The module 26 may be configured to obtain attributes of locations identified based on the location histories acquired by the location history acquisition module 24. For example, the module 26 may be configured to iterate through each location identified by each location history and query the geographic information system 18 for attributes of those locations at the time at which the user was at the corresponding location. In some cases, the location-attribute acquisition module 26 may also request attributes of adjacent locations, such as adjacent tiles, from the geographic information system 18 so that the user-attribute updater 28 can determine whether a signal from a given tile is consistent with that of surrounding tiles for assessing the reliability of various indications.

The acquired location histories and location attributes may be provided by modules 24 and 26 to the user-attribute updater 28, which in some embodiments, is configured to generate user profiles based on this data. In some cases, the user-attribute updater 28 is operative to perform portions of the processes of FIG. 2 or 3, described in detail below, and attach attributes of places visited by users to the profile of those users. These profiles may be stored by the user attribute updater 28 in the user-profile datastore 14.

The user profile datastore 14 may be operative to store user profiles and, in some embodiments, address queries for data in the user profiles. The illustrated user-profile datastore 14 includes a plurality of user-profile records, each record corresponding to the profile of a given user or a given mobile device 16. Each user-profile record may include an identifier of the record (which may be a value otherwise uncorrelated with the identity of the user to enhance privacy), and an identifier of the source or sources of the location histories from which the profile was created such that subsequent location histories can be matched with the profile (e.g. a account associated with a special-purpose application, a cell phone number, or some other value, which may be hashed to enhance user privacy).

Each user-profile record may also include a plurality of profile time records indicating attributes of the user profile at different times during some cycle of time (e.g., portions of the week or month, or during other periods like those described above with reference to the geographic information system 18). In some cases, the profile-time records may correspond to the same durations of time as those of the time-tile records described above. Each profile-time record may include an indication of the duration of time being described (e.g. Thursday's at dinnertime, or Saturday midmorning) and a plurality of profile attribute records, each profile attribute record indicating the propensity of the corresponding user to engage in an activity described by the attribute during the corresponding time of the profile-time record. The profile time records may allow tracking of when users tend to engage in a given activity (time of day, day of week, week of year). In some embodiments, the profile attribute records correspond to the same set of attribute records described above with reference to the geographic information system 18. Each profile-attribute record may include an indication of the attribute being characterized (e.g., attending a children's soccer game, having brunch at a fast-casual dining establishment, parent running errands, or shopping at a mall) and a score indicating the propensity of the user to engage in the activity at the corresponding time, such as a normalized value from 0 to 10. The attribute records may further include a sample size, indicative of the number of samples upon which the attribute score is based, for weighting new samples, and a measure of variance among these samples (e.g., a standard deviation) for identifying outliers.

As described below, the user-profile records may be used for a variety of purposes. For example, advertisers operating ad servers 22 may submit to the user-profile datastore 14 a query identifying one of the user-profile records, such as the above-mentioned hashed value of a user account number or phone number, and the user-profile datastore 14 may respond with the attributes of the corresponding user at the current time. In some embodiments, to further enhance user privacy, queries may be submitted for a specific attribute to determine whether to serve an advertisement corresponding to the attribute, or a query may request a binary indication of whether the attribute score is above a threshold.

In another example, the user-profile datastore 14 may be used by the user profiler 12 to augment the records in the geographic information system 18. For example, an index may be created for each attribute that identifies tiles where users having relatively strong scores (e.g. above a threshold) for the respective attribute tend to co-occur at given times. These indices may correspond to heat maps (though no visual representation need be created) indicating where, for example, users interested in golf, tend to be during various times of the day, such that advertisers can select advertisements based on this information. In some embodiments, an index may be created for each user attribute at each of the above-described divisions of time in the geographic information system 18, and these indices may be queried to provide relatively prompt responses relating to where users having a given attribute or combination of attributes tend to co-occur at various times. Precalculating the indices is expected to yield faster responses to such queries than generating responsive data at the time the query is received. For instance, using examples of these indices relating to fishing and employment in banking, an advertiser may determine that people who engage in fishing on the weekend and work in banking tend to drive relatively frequently along a particular stretch of road on Mondays during the evening commute, and that advertiser may purchase an advertisement for bass fishing boats on a billboard along that road in response. Other examples relating to customization of software and services and other forms of analysis are described in greater detail below.

In short, some embodiments of the computing environment 10 generate user profiles that are relatively privacy-friendly to users and consume relatively little effort on the part of users or others to create the profiles. These advantages are expected to yield a relatively comprehensive set of relatively high-resolution user profiles that may be used by advertisers and others seeking to provide information and services customized to the unique attributes of each user, facilitating the presentation of high-value and high-relevance advertisements and services to users while respecting the users' interest in privacy. That said, not all embodiments provide these benefits, and some embodiments may forgo some or all of these embodiments in the interest of various engineering trade-offs relating to time, cost, and features.

Figure 2:
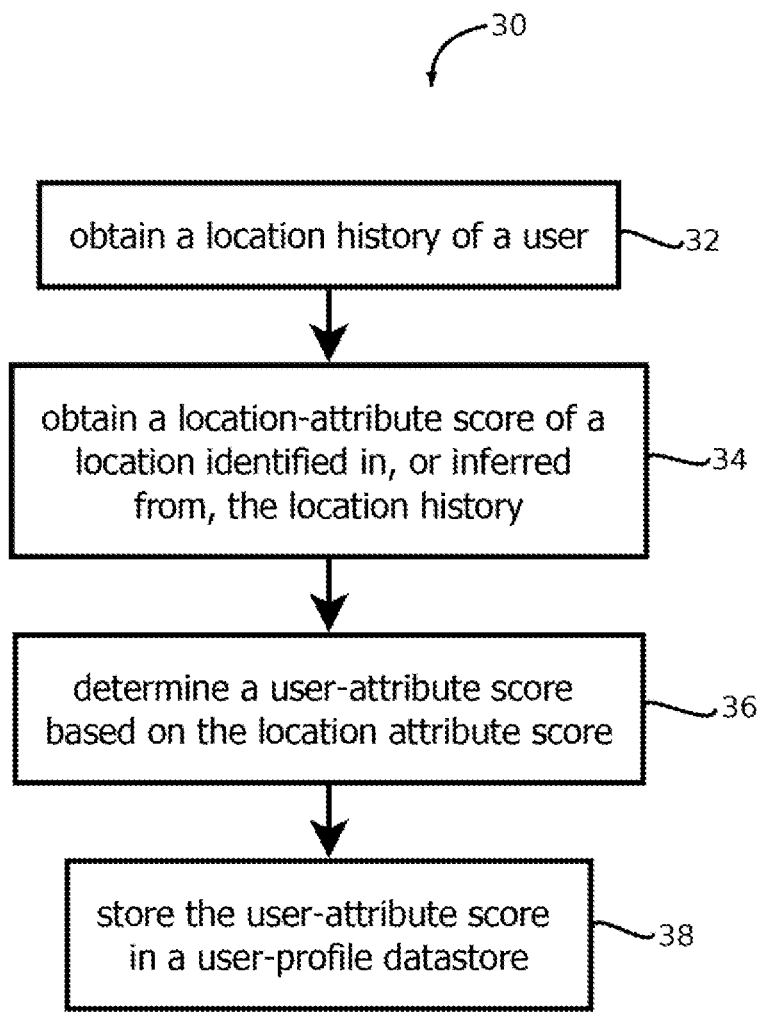
FIG. 2 shows an embodiment of a process for profiling a user.

FIG. 2 illustrates an embodiment of a process 30 that may be performed by the above-describes user profiler 12. The steps of the process 30 (and other processes described herein) may be performed in a different order than the order in which the steps are described. In some embodiments, the process 30 includes obtaining a location history of a user, as illustrated by block 32. This step may be performed by the above-described location-history acquisition module 24. As noted above, location histories may be obtained from a plurality of different providers of location histories, and the location histories may be reformatted into a common format for subsequent processing.

The process 30 of this embodiment further includes obtaining a location-attribute score of a location identified in, or inferred from, the location history, as indicated by block 34. This step may be performed by the above-described location-attribute acquisition module 26. The location-attribute score may be one of a plurality of scores corresponding to a time-tile record described above.

In some embodiments, locations identified in the location history may be relatively sparse, and intermediate locations between those explicitly identified may be inferred. For example, the user profiler 12 may determine that two locations are more than a threshold amount of time apart and a threshold distance apart, indicating that the user likely traveled between the location during the intermediate time. In response, the user profiler 12 may query the geographic information system 18 for locations associated with travel, such as locations corresponding to an interstate highway, between the two locations, and the locations along the interstate highway (or associated with some other mode of travel) may be added to the location history at the intermediate times as inferred locations. Inferring intermediate locations is expected to yield a more comprehensive characterization of the user's profile.

In some embodiments, the process 30 further includes determining a user-attribute score based on the location attribute score, as indicated by block 36. Determining a user-attribute score may include incrementing a sample size for the corresponding attribute in the user profile and calculating an updated average attribute score. An average is one of a variety of different forms of measures of central tendency that may be used to determine the user-attribute score. In other embodiments, previous attribute scores of locations visited by the user may be stored in memory, and a median or mode score may be calculated using the newly obtained location-attribute score and those stored in memory. Thus, deviations indicating one-time instance in which the user engaged in a particular activity will tend to have a relatively small effect on the user profile, as previous location histories will likely indicate a relatively low propensity to engage in a particular activity and dilute the effect of a single instance.

In some embodiments, the process 30 further includes storing the user-attribute score in a user-profile datastore, as indicated by block 38. As noted above, this may include updating indices corresponding to various attributes in a geographic information system, and the stored user profiles may be queried by advertisers and others seeking to provide targeted messaging and services. Targeting may be toward specific users who are profiled or to the places profiled users visit or based on patterns in attribute scores among profiled users.

Figure 3:
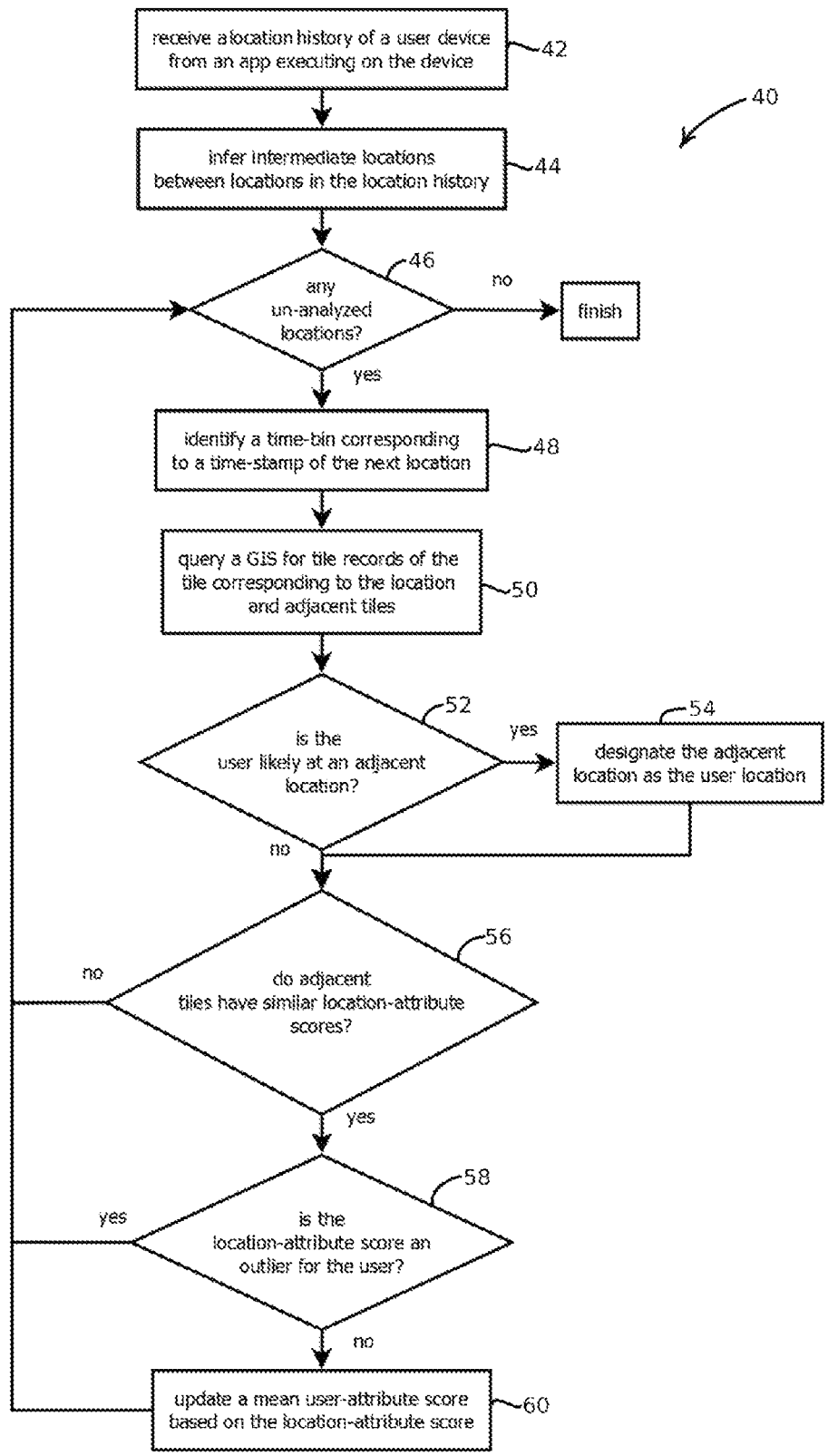
FIG. 3 shows an embodiment of another process for profiling a user.

FIG. 3 illustrates another embodiment of a process 40 for generating user profiles. This process may be performed by the above-mentioned user profiler 12. The illustrated process begins with receiving a location history of a mobile user device from an application executed on the device, as illustrated by block 42. Next, intermediate locations are inferred between locations in the location history, as indicated by block 44. As noted above, some embodiments may identify gaps in the location history and infer intermediate locations based on attributes of tiles between the boundaries of the gap, selecting, for example, intermediate tiles associated with transit. In this embodiment, the process 40 includes determining whether there are any un-analyzed locations in the location history, as indicated by block 46. Upon determining that no such locations remain, the process completes. Alternatively, upon determining that locations remain to be analyzed, the process 40 in this embodiment proceeds to identify a time-bin corresponding to a timestamp of the next location in the location history, as indicated by block 48. The time-bin may be one of the above-describes durations of time by which tiles or user profiles are characterized. The corresponding time bin may be the time bin in which the timestamp of the use location falls. Next, this embodiment of process 40 includes querying a geographic information system for tile records of the tiles corresponding to the location and adjacent tiles, as indicated by block 50.

In some embodiments, the process 40 further includes determining whether the user is likely at an adjacent location, as indicated by block 52. Such a determination may include making the determination based on the attributes of the adjacent tiles or density scores for the tiles corresponding to the timestamp of the user location in question. For example, attribute scores for the location in the location history may indicate that less than a threshold amount of user activity occurs within the tile corresponding to that location (e.g., a density value indicative of the number of people in the tile may be below a threshold), while attribute scores for one of the adjacent tiles may indicate a relatively high density or amount of activity (e.g., more than a threshold, or more than a threshold difference from the adjacent tile) for one or more attributes. In response to this difference, it may be determined that the location in the location history is in error (for instance, due to an inaccurate GPS reading), and the adjacent location may be selected as being a more likely location of the user. Some embodiments may select the adjacent location having the highest density or aggregation of attribute scores, for example. Thus, some embodiments may designate the adjacent location as the user location, as indicated by block 54, or in response to a negative determination in block 52, some embodiments may proceed to the next step without such a designation occurring.

Embodiments may further include determining whether adjacent tiles have similar location-attribute scores, as indicated by block 56. Because location measurements by mobile devices are often relatively inaccurate, there is some risk that the user is not at the location identified and is instead in an adjacent tile. However, if the adjacent tiles have similar attribute scores, those attributes can be attributed to the user with a relatively high degree of confidence regardless of whether the user is in the exact tile identified by the location in the location history. Accordingly, some embodiments may determine whether the adjacent tiles have similar location attribute scores (at the time in question for the user location), for example attribute scores less than a threshold difference for more than a threshold number of attributes. Other embodiments may calculate a confidence score based on the similarity of adjacent tiles and weight the modification of the user profile based on the confidence score, down weighting signals in instances in which the adjacent tiles are relatively different from one another, or a binary determination may be made as illustrated in FIG. 3. Upon determining that adjacent tiles do not have similar location-attribute scores, some embodiments return to block 46. Alternatively, the process may proceed to the next step.

Some embodiments of process 40 may include determining whether the location-attribute score is an outlier for the user, as indicated by block 58. This step may include iterating through each location attribute score of the user's location and comparing that attribute score at the time in question to a corresponding attribute score in the users profile to identify uncharacteristic behavior indicative of a potentially misleading signal. In some embodiments, attributes may be designated as an outlier in response to the location attribute score exceeding a threshold difference from the average, for example location attribute scores more than three standard deviations higher or lower than the average attribute score in the user profile for a given attribute. In some embodiments, the determination of step 58 is made for each of a plurality of attributes of the location, and those attributes deemed to be outliers may be filtered before proceeding to the next step, or some embodiments may return to step 46 in response to the detection of an outlier. Some implementations may use a similarity model to detect inaccurate signals in acquired location histories. Using such models, embodiments may filter out questionable location readings so as not to pollute profile development. For instance, a reliability database similar to the GIS may be referenced during profile analysis by submitting a query with metadata about entries in a location history (e.g., publisher, time of day, location, OS, device type, location determination method (e.g. GPS vs. WiFi™ or other wireless network)). The reliability database may provide a response indicative of the predicted level of accuracy of the incoming location. The reliability database may store data from sources know to be reliable, and this data may indicate expected levels of activity at a location. If a specific data set diverges significantly from this (e.g., attribute scores for a tile are more than a threshold amount different from those in the reliability database), in response, the user profiler may flag the location history as likely being less accurate, and based on such flags, the data may be discarded or changes to user profiles may be down weighted.

Upon determining that the location-attribute score is not an outlier, the process 40 proceeds to step 60, and a mean user-attribute score is updated based on the location-attribute score. Updating the user-attribute score may include updating each of a plurality of user-attribute scores based on a plurality of location-attribute scores that were not filtered out in step 58. Updating the user-attribute score may include multiplying the current score by a count of measurements upon which that score is based, adding to the resulting product the location-attribute score, and dividing this some by the count plus one to calculate a new average user-attribute score. This value and incremented version of the count may be stored in a corresponding attribute record in the user profile.

The process 40 may be repeated for each of a relatively large number of location histories, each location history corresponding to a different user profile. The process 40 may be repeated periodically, for example nightly, weekly, or monthly to update user profiles and instantiate new user profiles. The resulting user profiles may be stored in the above-mentioned user-profile datastore 14.

In some cases, after updating user profiles, various indices may be formed to expedite certain queries to the geographic information system 18. For example, some embodiments may form an index keyed to each attribute for which a score is maintained in the tile records or the user-profile records. For example, embodiments may calculate an index that identifies each tile in which users having more than a threshold score for a given attribute co-occur during one of the above-described time bins (e.g., by multiplying a density score for each tile with an attribute score and thresholding the resulting product). This index may be used to relatively quickly determine whether a given geographic area at a given time is correlated with a given attribute and has a high density of people exhibiting behavior described by that attribute. Further, some embodiments may use such an index to identify geographic areas in which a collection of attributes are relatively strong, for instance determining the union of the set of values corresponding to each of a plurality of different attributes to identify, for instance, where users associated with golfing, fishing, and tourism are at a relatively high concentration on mid-afternoons on Sundays.

Embodiments of the process 40 may be performed concurrently on multiple computing devices to expedite calculations. For instance, a master computing device may iterate through a list of user device identifiers and assign profiling tasks to each of a plurality of profiling computing devices, each of which determine corresponding profiles for different users at the same time. Using similar techniques, the formation of indices may also be parallelized. For instance, each attribute may be assigned to a different set of computing devices, and that set of computing devices may identify the areas in which the attribute has certain criteria (e.g., greater than a threshold amount of activity), while other sets of computing devices perform the same task for different attributes. Such concurrent operations are expected to facilitate faster computation of profiles and indices than would otherwise be achieved, though not all embodiments provide for concurrent operations.

Other uses of concurrency may expedite data retrieval. For instance, querying a GIS once for each user event (e.g., a particular user being present in a tile at during a particular window of time) may be relatively slow, as the number of such events can be very large. To expedite retrieval from the GIS, some embodiments may group events to reduce queries. Such embodiments may include a master computing device (e.g., a virtualized or physical computing instance) that maps each tile to one of a plurality of other computing devices (e.g., a virtualized or physical computing instance) and instructs those devices (e.g., over a local area network in a data center) to gather data from the GIS about events occurring in their respective assigned tile or tiles. In response, the other computing devices may each filter the user events occurring within their respective tile from the obtained location histories, each forming an event group of events occurring within an assigned tile, and submit one or more queries to the GIS for attributes of the tile during relevant time periods corresponding to user events in the group (e.g., when a user was in the tile). After the responsive data is retrieved, the other computing devices may then iterate through each user having user events in the event group and join the responsive GIS data for each user with the corresponding user profile. Thus a single query, or one query per time period in question, may retrieve relevant data for a plurality of user events, thereby reducing the number of queries to the GIS and expediting analysis of user histories. Further, parallelizing the analysis for different tiles across multiple computing devices is expected to further expedite such analyses.

Further, in the above example of concurrent operation in which different tiles are assigned to different computing devices, each of the other computing devices holds in memory user profiles for users passing through the tile. This user profile data may be aggregated to calculate or update a count for the tile at a particular window of time, e.g., by counting the number of user profiles corresponding to the tile at a particular time and having a particular attribute, such as an attribute score greater than a threshold. Again, concurrent operation is expected to expedite analysis, and aggregating the user profile data corresponding to the respective tiles while this data is in memory for purposes of updating the user profiles is expected to reduce calls to the user-profile data store and speed analysis.

In some embodiments, analysis of user profiles is parallelized according to the combination of user profile and attribute, such that different computing devices analyze different attributes for a given user concurrently and different computing devices analyze different users concurrently (e.g., mapping user A, attribute X to device 1; user A, attribute Y to device 2; user B, attribute X to device 3; etc.). Again, a master computing device may map profile-attribute pairs to each of a plurality of other computing devices and instruct those devices (e.g., over a local area network in a data center) to sum the counts for those attributes for those users across all of the tiles having data for those users. For instance, the above technique may be used to analyze each of a plurality of tiles concurrently with different computing devices mapped to different tiles, and then the technique of this paragraph may be used to aggregate this data for each user profile/attribute pair across the tiles, e.g., by querying the devices analyzing tiles for data about a given user and attribute and summing (or otherwise aggregating) the responses. Again, this technique is expected to offer relatively fast concurrent operation and reduce calls to data stores that might otherwise slow the analysis.

The user-profiles resulting from the above describe processes and systems may be used in a variety of contexts. For example, as noted above, advertisements may be selected based on the user profiles. In another example, the user profiles may be used to do market research, for example, by identifying which attributes score relatively high at each of a business's locations at certain times to characterize the customers of that business. In another example, the user profiles may be used to customize the look and feel or operation of software operated by the user, for instance configuring application differently for a user known to have children relative to the look, feel, or operation presented to a user who has attribute scores that indicate that user likely does not have children.

Thus, the above-describes processes may yield user profiles in an automated fashion, at relatively low expense, and in a privacy friendly manner. Associating attributes of geographic locations visited by the user to the user's profile, and accounting for the time of day at the geographic location, and for the user, are expected to yield relatively accurate user profiles that account for the different ways people behave during different times of the day. Further, inferring intermediate locations is expected to yield a relatively high resolution characterization of users, and determining whether the user is at an adjacent location, whether adjacent locations have consistent attributes, and whether the attributes of a given location are outliers for the user are expected to further improve the quality of the user profile. It should be noted, however, that not all embodiments provide these benefits.

As noted above, in some cases, the user profiler 12 of FIG. 1 generates user profiles based on the location histories of mobile devices 16. As mentioned, in some use cases, the location histories are not acquired directly from the mobile devices 16 and are instead obtained from third parties, such as cell phone carriers, advertising networks, operators of native mobile device applications, and other entities with access to location histories from a relatively large number of users, such as tens of thousands, hundreds of thousands, or millions of users. These location histories may be provided in a location data set including location histories from a relatively large number of users collected over some duration of time, such as over the preceding hour, day, week, month, or year. In some cases, a batch process is used to generate user profiles in response to receipt of a new location data set.

As discussed above, often different providers of location data sets use different identifiers for a given user. Often, the location data set identifies users uniquely within a given data provider's system, but does not identify users canonically, as each data provider often has a different unique ID for the same user, thereby impeding efforts to match a record (e.g., a location history) about a user from one data provider with a record about the same user from another data provider. (The use of non-canonical identifiers is referred to as anonymization herein, but the intent behind the use of these inconsistent identifiers need not be to anonymize for the present techniques to apply.) Also as noted above, when users update their equipment, e.g., with a new cell phone, it can be difficult to tie their existing profile to data from the new equipment, as the user identifiers are often based on identifiers of the mobile device. Consequently, it can be difficult to use location data sets from third parties to generate user profiles.

Figure 4:
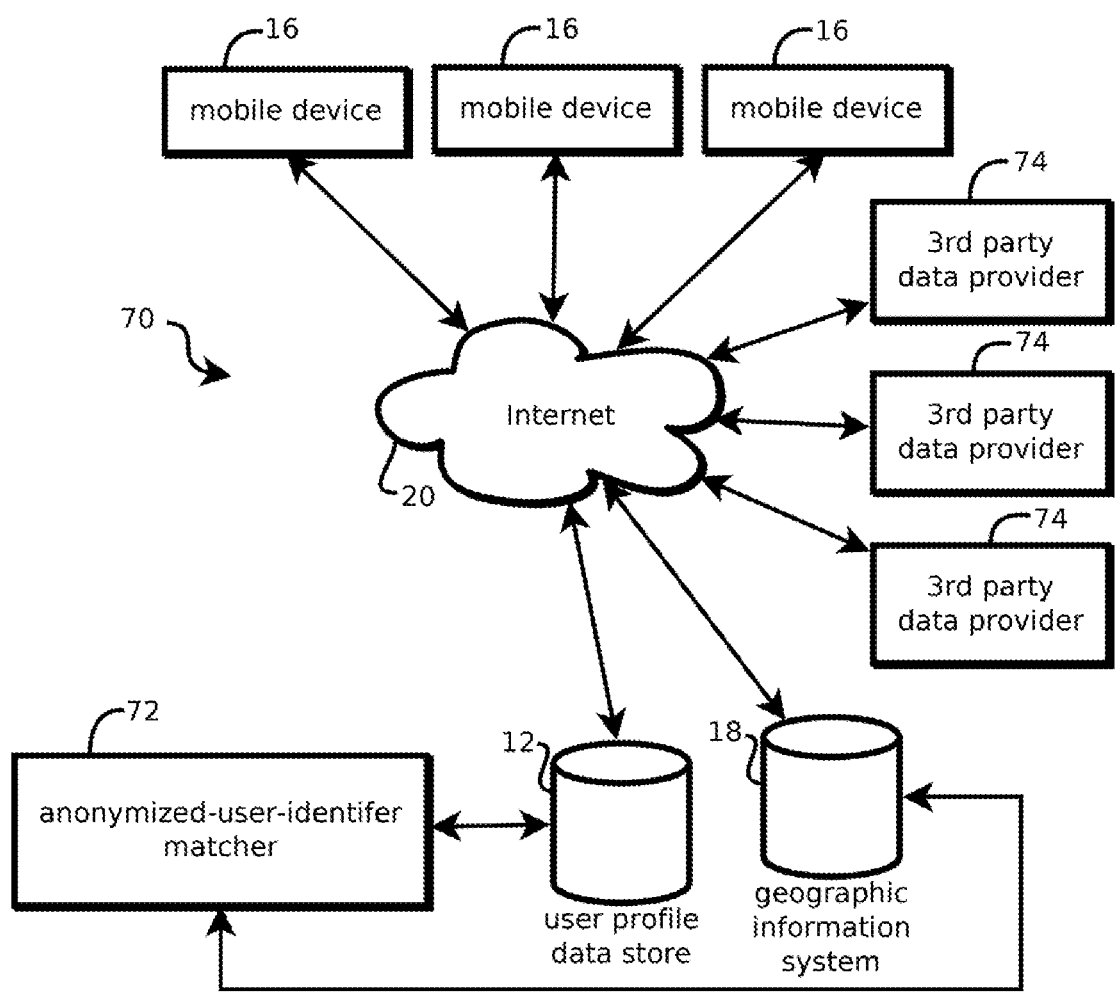
FIG. 4 shows an example of a user profiler configured to match non-canonical user identifiers in accordance with some embodiments.
Figure 5:
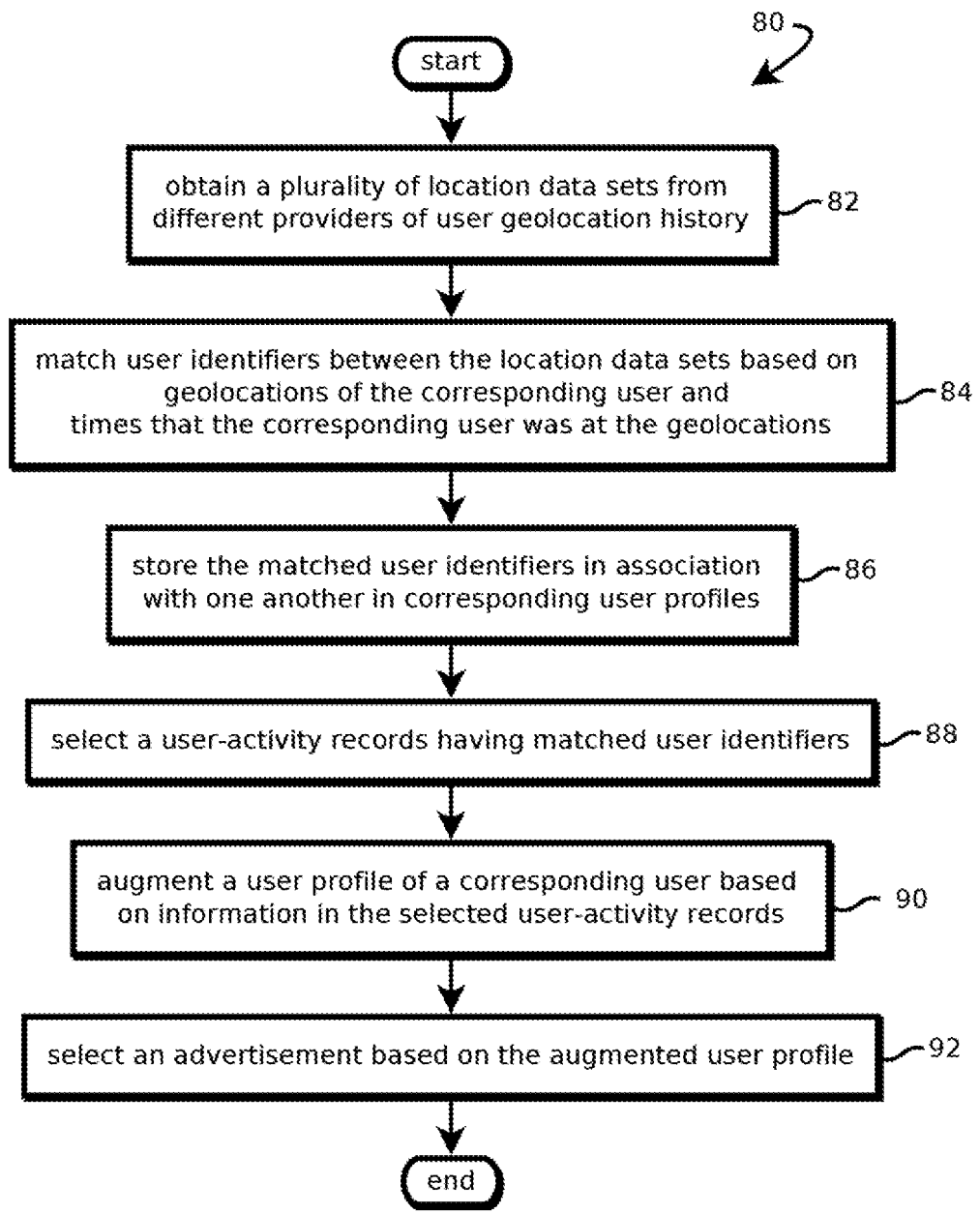
FIG. 5 shows an embodiment of a process for matching non-canonical user identifiers.

FIG. 4 shows an example of a computing environment 70 configured to update user profiles based on anonymized data from multiple third-party data providers. In some cases, the computing environment 70 includes the components of the computing environment 10 of FIG. 1, as the techniques described with reference to the computing environment 70 may yield richer location histories of users that are used by the user profiler 12 to generate user profiles. As illustrated, in addition to the features shared with the computing environment of FIG. 1, the computing environment 70 of FIG. 4 includes an anonymized-user-identifier matcher 72 and a plurality of third-party data providers 74. Components 72 and 74 may be constructed from one or more properly programmed computer systems, like those described below with reference to FIG. 9, based on the operations described below.

Reference numbers shared between FIG. 4 and FIG. 1 refer to the components and features described above. That said, the techniques described below are not limited to systems having the features described above and are independently useful for other purposes, such as profiling geographic areas rather than profiling users (which is not to imply that the system above is limited to profiling users).

In some cases, the computing environment 70 of FIG. 4 executes some or all of a process described below with reference to FIG. 5 to match user identifiers across location data sets from different third-party data providers and generate (e.g., create, update, or otherwise augment) user profiles. As explained below, in some embodiments, user identifiers are matched between data providers based on similarities between time and geolocation data associated with the user identifiers in data from different data providers.

For instance, cellular records in a location data set may indicate that anonymized user ID "12Dfs93sadkg38" (e.g., a number based on a hash of the User's UDID or phone MAC address) is within a first 100-meter square geographic area for 80% of workday hours (e.g., in their workplace) and within a second 100-meter square area for 60% of weekend hours (e.g., in their home). And data from an ad network may indicate that another anonymized user ID "19371349839849302355" is associated with an account that viewed ads in the same first 100-meter tile during workday hours and in the same second 100-meter tile during weekend hours. Based on these similarities, the embodiments may determine that anonymized user ID "12Dfs93sadkg38" from the cellular records corresponds to the same user as anonymized user ID "19371349839849302355" from the ad network. Embodiments may also calculate a confidence value for the correlation based on the amount of similarity and the sample size. Based on this correlation, embodiments may generate (e.g., create, update, or otherwise augment) a user profile of the user based on data from both the cellular network and the ad network. The generated user profile may be used by advertisers to target more relevant ads to the user.

In many systems, however, the matches may be more complex than matching single tiles at one or two times of day. Often location histories for a given user span several point clouds of locations and times (e.g., each corresponding to a cluster near their work, near their home, and near businesses or roads they frequent), with each geolocation being associated with varying degrees of geographic resolution and confidences in the determination of location. Further, the location data sets are often relatively large, covering millions of users each with such a point could developed over days or weeks, such that processing the data can take a relatively long time to identify matches absent techniques to expedite the operations, such as appropriate use of concurrency and data structures configured to expedite data retrieval. Embodiments described below may accommodate this added complexity (though the present techniques are not limited to the more complex use cases).

The anonymized-user-identifier matcher 72 may execute certain steps of a process shown in FIG. 5 for matching user identifiers across location data sets, using the matches to generate user profiles, and using the user profiles to select advertisements to present to the profiled users. Like the other processes described herein, embodiments are not limited to the order of the steps depicted, nor to systems that perform all of the illustrated steps, as data at intermediate stages is independently useful.

For example, more generally, embodiments may obtain a plurality of location data sets, each location data set being from a different third party data provider and having a different user identifier for a given user (e.g., an identifier based on the user's equipment or account). Each location data set may include a plurality of user-activity records. Each user-activity record describe activity (including user location history—like a sequence of time-stamped geolocations—and, in some cases, additional context, like information about the user's device or information about a computing session) of a single user on the respective third party's system. Some user-activity records include only a list of user-identifiers and associated location histories, and some user-activity records include additional context. Additionally, each user-activity record has a user identifier that is unique among other users of that system (e.g., a hash of the user's MAC address or phone number), but does not serve to explicitly identify (e.g., with a string text match) the user in records from other third party systems, e.g., because those other systems use a different hash algorithm or different input data for forming an anonymized user ID.

Some embodiments of the process 80 include obtaining a plurality of location data sets from different providers of user geolocation history, as shown in block 82. As noted above, in some cases, geolocations are obtained by the third-party data providers 74 based on wireless signals sent by or received from the mobile user devices 16. Examples of such wireless signals include wireless signals from satellite positioning systems sensed by a global positioning system location sensor on the mobile user devices 16. Other examples include cell tower triangulation of the mobile user device, for instance, performed by, or at the behest of, operators of cellular networks, or wirelessly transmitted locations sent from the mobile user devices to the cellular networks.

In some cases, a native mobile application (e.g., as downloaded from a pre-approved collection of such applications on a platform hosted by an entity providing an operating system for the mobile device) on the mobile user devices 16 queries the operating system of the device to obtain a geographic location of the device. For example, some examples of native applications executing the iOS™ operating system may instantiate a member of the CLLocationManager class provided within that operating system and use methods of the class to obtain the geolocation of the mobile user device. In another example, some examples of native applications executing on the Android™ operating system may instantiate a member of the LocationProvider class provided by the operating system and use methods of the class to obtain the geolocation of the mobile user device. In some cases, third parties may distribute native applications on multiple operating systems, and different mobile user devices having the different operating systems may report back geolocation for inclusion in a single location data set.

Each location data set may include location histories of a relatively large number of users, e.g., more than ten thousand or more than one million. Within a location data set, the location histories may span some duration of time, for instance, the previous hour, day, week, or month (though the trailing duration need not extend to the current time). Each location history may include a plurality of time-stamped geolocations documenting the geographic location of a mobile user device over time (e.g., at times a native application is interacted with by a user or at times an advertising network serves an ad to the user, e.g., in a mobile web browser). In some cases, the location histories for a given user include more than ten, more than a hundred, or more than a thousand time-stamped geolocations, depending on the fidelity of the data. In some cases, the geolocations are expressed with coordinates, such as latitude and longitude, with varying levels of significant digits (or other measures of granularity) among the data providers. Or in some cases, for some providers, the geolocations are expressed with reference to some other geographic area, such as zip codes, or advertising designated marketing area (DMA). In some cases, each geographic location is associated with a geolocation confidence score indicative of the reliability of the measured location, e.g., 80% confidence radius based on the quality of GPS signals received, or a percentage indicative of the confidence that the device is within some predetermined radius, such as within 100 meters of the reported geolocation. Different data providers may provide location data sets with different permutations of the preceding attributes of location histories.

For each location data set, embodiments may generate (e.g., extract, validate, and normalize) a plurality of user-location records from the data set, the user-location records being normalized location histories, e.g., from user activity records in the location data sets. Each user-location record may include the third-party user identifier for the respective location data set and a set of time-stamped geolocations of the user (e.g., latitude and longitude coordinates, or identifiers of geographic areas, such as identifiers of tiles). In some cases, the time-stamps describe a duration of time during which the user was in the area.

In some cases, the user activity records are normalized so that locations and times from different third-party data providers are expressed in the same format, for instance, by converting expressions of time using one set of units into expressions of time using a common set of units (such as the units of the tile times discussed above) and by converting expressions of geolocation using one set of units (such as latitude and longitude or zip code) into expressions of geolocation using a common set of units, such as the above-described tiles.

Normalizing times to the above-described times of the time-tile records may make the matching process relatively sensitive to periodic behavior of users, as the time-tile records in some embodiments correspond to activities in a work-week cycle. This is expected to improve accuracy relative to non-periodic detection techniques for users who generally follow a weekly schedule, such as weeks in which they spend more time on the weekend at home and more time during the workweek in the office. Other periodic cycles may be used, e.g., a daily periodic cycle. Or, other embodiments may normalize time to a non-periodic value, such as a number of minutes or hours since an arbitrary date to account for non-periodic behavior of users.

In some cases, some location data sets may use relatively low-resolution expressions of geolocation, such as a zip code, or a latitude and longitude with relatively few significant digits. In some cases, a single geolocation from a third party location data set may correspond to multiple tiles. In some cases, normalization may include converting the low-resolution geolocation to a center tile among the corresponding multiple tiles (for instance, selecting a centroid tile in a collection of tiles covering a zip code). In other cases, a single low-resolution geolocation from a third party data provider may be normalized by mapping that geolocation to a plurality of tiles covering the corresponding low-resolution geolocation (such as all of the tiles covering a zip code). In this example, the plurality of tiles corresponding to a single low-resolution input geolocation may be assigned a weight, such as the reciprocal of the number of tiles to which the single low-resolution input geolocation is mapped, and that weight may be accounted for when matching clusters from different location data sets. For instance, a center of gravity that accounts for the weight of the vectors may be calculated for each cluster, and clusters may be compared based on differences in distance between the centers of gravity.

Additionally, in some cases, confidence scores for geolocations in location data sets may be normalized with a variety of techniques. In some implementations, the confidence scores are ignored, e.g., when large sample sizes are sufficient to overcome noise. In another example, weights may be assigned to time-location vectors based on (e.g., as an inverse function of) the confidence scores, for instance, assigning a weight of 0.8 to a vector based on an 80% confidence score. Such weights may be accounted for when matching clusters from different location data sets, e.g., using the technique described above.

Some embodiments of process 80 may include matching user identifiers between the location data sets based on geolocations of the corresponding user and times that the corresponding user was at the geolocations. For each user-location record of a given data set, embodiments may search other data sets for corresponding user-location records. For instance, for the respective user-location record of the given data set, embodiments may calculate time-location vectors for each location-time-stamp pair in each user-location record (e.g., with scalars of latitude (or a tile-count equivalent), longitude (or a tile-count equivalent), and time-period elapsed since a fixed reference, or time of the week to capture periodic behavior associated with the work week).

To prepare to match user identifiers across location data sets, some embodiments may then identify clusters among the vectors using, for instance, various centroid-based clustering algorithms (e.g., k-means), density-based clustering algorithms (e.g., DBSCAN), or distribution-based clustering algorithms (e.g., a Gausian distribution model). As a result, each location data set may include a plurality of cluster records, each cluster record corresponding to a user identifier in the at location data set, and each cluster record including one or more clusters of time-location vectors based on the location histories of that user. Some embodiments may then perform this vectorization and clustering process for each user-location record in the other data sets, yielding additional sets of clusters, each set being associated with a user identifier of the respective location data set.

To expedite operations, some embodiments may cluster location histories for multiple user identifiers concurrently. For instance, a plurality of processes executing on a plurality of computers may concurrently perform a process of 1) requesting a location history for a given user identifier; 2) clustering the location history; 3) returning a set of clusters for the location history of the given user identifier; 4) repeating. In some cases, the dimensions of the clusters may be reduced as part of forming the clusters to reduce memory access time of processes and data transfer times between processes. For instance, a cluster may be represented as a center point (e.g., a centroid or center of mass for weighted vectors) and a radius. Or a cluster may be represented in output of the clustering process by a bounding volume, such as a convex hull of the points in the cluster.

These sets of clusters for a given user identifier may be compared to sets of clusters for user identifiers in other location data sets to match user identifiers across location data sets. To this end, embodiments may perform a matching process for each user identifier in a given location data set. The matching process for a given user identifier may include: 1) obtaining the cluster record for the given user identifier in the location data set (which may be referred to as having the reference cluster set); 2) obtaining all cluster records for another location data set; and 3) determining which cluster record in the other location data set has a cluster set (called a comparison cluster set) most similar to that of the reference cluster set. The user identifier of the most similar comparison cluster set may be deemed a match to the user identifier of the reference cluster set.

Thus, to match user identifiers, in each of the other data sets, the user-location record with the most similar comparison clusters to the reference clusters may be deemed a matching user-location record. In some cases, a similarity score is calculated for each pair of reference cluster and comparison clusters, and the similarity score must exceed a threshold to constitute a match. When multiple comparison clusters exceed the threshold, the most similar comparison cluster may be deemed a match, or the most similar cluster may be deemed a match without regard to a threshold.

Similarity scores may be calculated with a variety of techniques, including based on a Euclidean distance between centroids of the clusters being compared (or based on Euclidean distance of centers of mass for weighted vectors) or based on a volume of overlap of convex hulls of the clusters. For instance, a root mean square of the Euclidean distances between each cluster in a reference cluster set to a closest cluster in a comparison cluster set may be calculated as a similarity score. Or, in another example, the similarity score may be the percentage of the overlapping convex hull volume to the sum of volumes of the convex hulls of clusters in a reference cluster set and a comparison cluster set.

Because matching may be a time-intensive process for data sets with a large number of user identifiers, some embodiments may expedite processing with various techniques. For instance, some embodiments may execute concurrent matching processes in which each of a plurality of different processes (e.g., more than ten, one hundred, or one thousand) is assigned a different reference cluster set to which a match is to be found. To expedite matching, some embodiments may group or sort and store the comparison cluster sets according to location (or time), so that unviable comparison cluster sets may be quickly discarded and likely matches may be quickly identified. For instance, the comparison cluster sets may be grouped according to the US state most heavily represented among their constituent clusters and the reference cluster set may be similarly grouped. The reference clusters set may then only be compared to comparison cluster sets in the same or adjacent US states (or other arbitrary geographic areas of varying size may be used for grouping). Or the comparison cluster sets may be presorted. For instance, a centroid of the comparison cluster sets may be determined, and comparison cluster sets may be sorted according to location of the centroid on a space filling curve, like a z-curve. Embodiments may then search only within a threshold distance on the space filling curve for matches.

Embodiments may proceed through each of the other data sets, searching the matching user-location records in the remaining data sets for each user-location record in the other data set that has not yet been matched. Thus, embodiments may start, for example, with cellular carrier data from which reference clusters are formed and matched to other data sets and then proceed through those other data sets, e.g., a data set from an ad network, and form reference clusters for, for example, the ad network to be matched.

In some cases, information beyond time and location may be used for matching. For instance, in some embodiments, each user-activity record includes additional information about the mobile user devices, such as an operating system type, a device manufacturer identifier, a component manufacturer or version identifier, a software maker or version identifier, or the like. Some embodiments may use this additional information to match user identifiers across data sets from different third-party data providers. For example, candidate matches may be filtered based on whether this additional information is consistent across user activity records from two different location data sets. A cluster set from location data set A for a given user identifier may align relatively closely in time-location vector space with the cluster set from location data set B associated with another, potentially corresponding user identifier, and upon detecting this potential match, some embodiments may then determine whether any additional information in the data set A for the potentially corresponding user is inconsistent with that of data set B, determining, for instance, to reject the match in response to determining that the operating system is different, the component manufacturers different, or the like. Upon rejecting a match, embodiments may then evaluate the next closest match in response.

In other cases, the same user may use different mobile user devices to interact with systems of different third-party data providers, for example, using a tablet for certain third-party data providers services and using a cell phone for other third-party data provider services. To account for this use case, some embodiments may ignore differences in the other aspects of user activity records, such as different device manufacturers, and match user identifiers based on activity occurring on different devices with patterns that overlap or a similar in space and time.

In some cases, the preceding steps of process 80 may be performed by component 72 of FIG. 5, while the subsequent steps may be performed by the components described with reference to FIG. 1. Next, in the process 80, some embodiments store the matched user identifiers in association with one another in corresponding user profiles, e.g., in the above-described profiles, as shown in block 86. The user-identifiers of the matching user-location records may be stored in association with one another in memory, e.g., in a canonical user-identifier record, having the matching user-identifiers from the different data sets and a canonical user identifier associated with a user profile of the user. In some cases, each link to a user identifier is also associated with a confidence score based on (e.g., equal to) the similarity score of the clusters. Examples of the user profiles are described in U.S. patent application Ser. No. 13/734,674, filed Jan. 4, 2013, which is hereby incorporated by reference in its entirety for all purposes.

Some embodiments of process 80 then select a user-activity records having matched user identifiers and augment a user profile of a corresponding user based on information in the selected user-activity records, as shown in blocks 88 and 90. Finally, some embodiments may select an advertisement based on the augmented user profile, as shown in block 92.

Embodiments are not limited to matching across data sets from different third party location data set providers. In some cases matching may be performed within location data sets from a single provider, or from a single provider to an existing user profile.

In some cases, user-location records within a single data set are matched to detect that a user has begun using a new computing device. For example, a user may acquire a new cell phone, and a carrier may calculate a different user identifier hash value based on a different MAC address of the new phone. As a result, the new user-activity records for the user will generally not tie to the older user-activity records for the same user, due to different resulting user identifiers calculated based on different attributes of the user's computing device. Embodiments may mitigate this problem by matching the new user identifier to the user identifier from the same data provider corresponding to the user's older cell phone, or other user computer device. The correspondence may be stored in memory, and records from the data provider relating to either the older or the newer user identifier may be used to augment the same user profile. Consequently, in some cases, an existing user profile may continue to be used even when the user switches to new computing equipment (or a new account, or other aspect from which an anonymized user identifier is determined by the data provider).

Further, in some cases, user-location records in a user profile are matched to the given data set, rather than (or in addition to) matching directly between data sets. For example, user profiles may be associated with a user-location record that is augmented with additional time-stamped user locations as new data sets are matched to that profile and as additional data is acquired from the data providers.

Some embodiments refine or serve as alternatives to some of the above-described techniques for reconciling different computing device identifiers (also called user identifiers in some cases) used by different sources of network activity data indicating geolocations of those computing devices, depending upon the implementation. In some cases, maintaining a single, canonical device identifier in a geolocation analytics system may give rise to certain challenges.

For example, in some cases these identifiers are matched to an external-namespace device identifiers in a batch process, often including several months or years of trailing data. In some cases, these batch processes are relatively time-consuming and, as a result, are run relatively infrequently. This can cause delays between when the true mapping between external and internal-namespace device identifiers changes and when that change is reflected within the location analytics system. It can be expensive, slow, and in some cases computationally infeasible to reprocess all existing logs, databases, and relationships there and reflect a change in internal-namespace device identifiers. (None of which is to suggest that batch processes are disclaimed or inconsistent with the present techniques.)

Another consequence of some versions of this approach is that problems can arise when internal-namespace device identifiers are changed, potentially breaking mappings in existing data structures constructed over months and potentially years. Often historical data is logged in the geolocation analytics system in association with internal-namespace device identifiers, and often other data is enriched (e.g., profiles of people or places) in association with those identifiers. Internal-namespace device identifiers may change for a variety of reasons. For example, a naming schema may be changed to accommodate a larger population or increase the semantic content of internal-namespace device identifiers. Or better information may be obtained about the appropriate mapping between external and internal namespace identifiers, and an internal-namespace device identifier previously considered as distinct or even unknown, may become mapped to an external-namespace device identifier on receipt and analysis of information of the relationship. Such changes can break backward compatibility with older data. In some cases, the appropriate mappings between external namespaces and internal namespace is may evolve over time, as information is gathered, but in the interim, the extant mappings may be used to create various data structures encoding relatively computationally expensive analyses that are difficult to reuse in the absence of the mappings present at the time the analyses were performed.

Complicating these changes, in some cases, information only pertains to a subset of the external-namespace device identifiers by which a given device (or what is perceived to be a given device based on limited data) is identified. For example, records may be obtained to indicate a given device (that is a computing device, for instance a mobile computing device) is likely designated by one source of network data with identifier X and it is likely that that same given device is designated by another source of network data with identifier Y. Later, the data may be obtained that suggests identifier X is actually more likely pertains to a different internal-namespace device identifier, but that data may not apply to the mapping from device identifier Y.

Finally, each of these issues is further complicated by the scale of data in commercial use cases and the expected responsiveness of systems that are commercially deployed. Many more computationally naïve approaches to addressing the above problems, while simpler to implement, do not scale adequately, for instance leading to algorithms that double in computational complexity, memory consumption, or runtime with each additional device identifier or network transaction. In many cases, the number of computing devices being analyzed exceeds 100,000, and in many cases more than 1 million, or more than 100 million, and the number of network activity records indicating geolocated transactions may exceed 1 million, and in many commercially relevant use cases exceed 1 billion, for instance, within a given month. New data points may be created at a rate exceeding 500 to 2000 per second. At the same time, those using geolocation analytics systems expect relatively current data and analyses from those systems. Existing techniques for configuring computer systems are not suitable to the task.

Some embodiments may mitigate these and other issues, or various subsets thereof, with the technique described below with reference to FIGS. 6 and 7. In some cases, an associative data structure may be created for each external namespace (e.g., for operating system specific advertising device identifiers, for hashed anonymized device identifiers generated by other data sources, and the like). In some cases, a given external-namespace device identifier may be used to calculate an index that points to a record in one of these data structures, and that record may store a plurality of different internal-namespace device identifiers. This plurality of different internal-namespace device identifiers may evolve over time (gaining and losing members) and provide mappings that persists even when a new internal-namespace device identifier is mapped to a given external-namespace device identifier. In some cases, data associated with these internal-namespace device identifiers may indicate reliability of these device identifiers and relationships there between, for instance in a versioning graph indicating a lineage of internal-namespace device identifiers.

With these records, older analyses and logs may remain useful even when mappings change, as one of the plurality of different device identifiers may serve as a link back into the older records while still permitting the mappings between external and internal-namespace device identifiers to evolve. Further, the data structures may provide relatively low latency access to these internal-namespace device identifiers, with the access technique, with relatively high granularity, supporting different mappings for different external namespaces. The flexibility afforded by these techniques may support real-time updates to the mappings, eventually yielding more accurate and up-to-date analyses from a geolocation analytics system.

Figure 6:
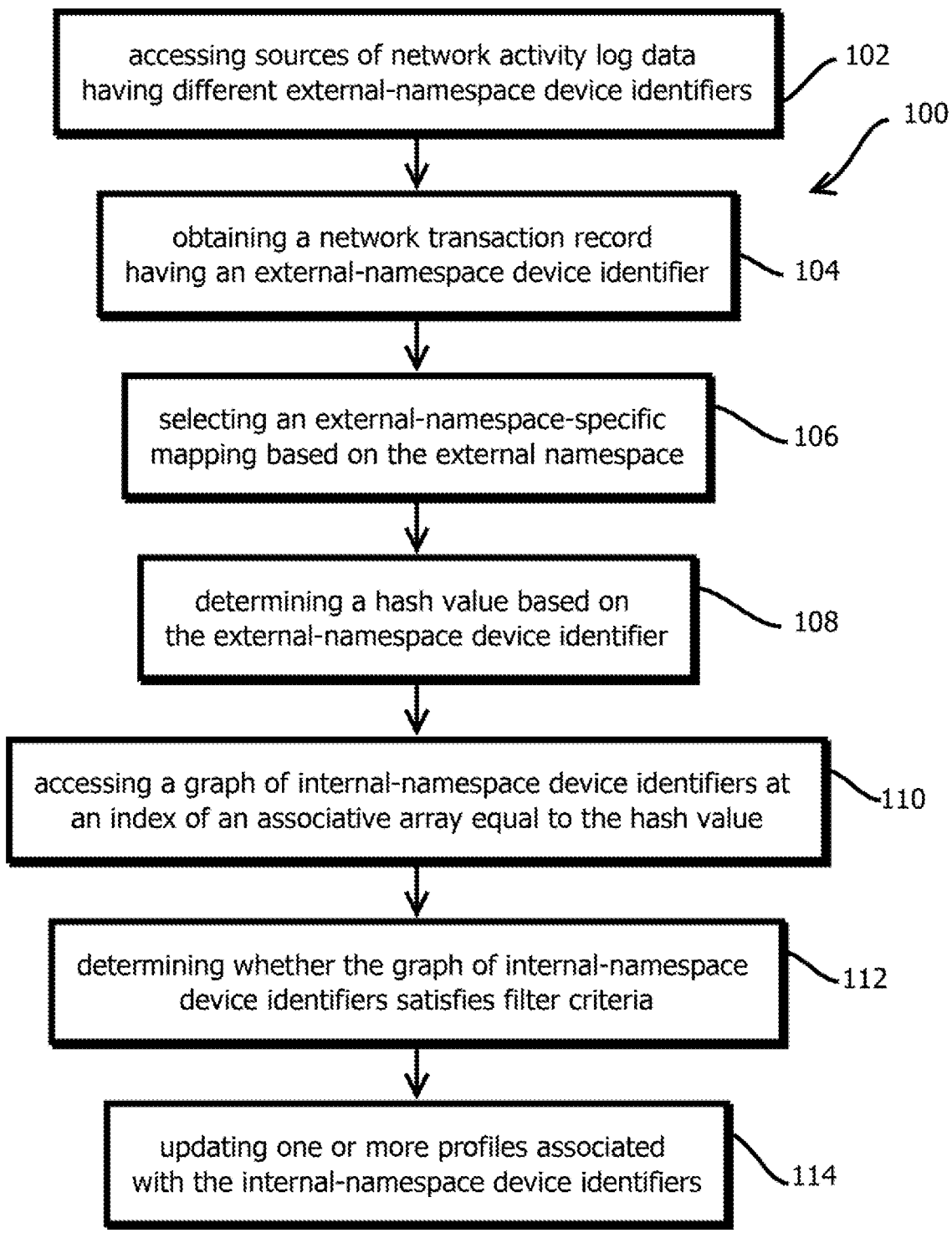
FIG. 6 shows an embodiment of a process for forming branching system(internal)-namespace device identifiers mapped to non-system(external)-namespace device identifiers.

Some embodiments include the process 100 of FIG. 6 may create these data structures and update a multi-namespace mapping stored in these data structures. In some cases, the process 100 may operate on an asynchronous set of streams of data, for example, streams of network activity data including the information in the above-described location data sets. Or in some cases, the process 100 may operate as a batch process, for example, executed nightly, weekly, or monthly, on batches of logged streams of network activity data. In some cases, the process 100 may be executed in multiple instances, concurrently, in some cases asynchronously, to parallelize operations on relatively large amounts of data. Or in some cases, a single instance may operate on the data. The process 100, and the other processing functionality described herein, may be implemented with machine-readable code stored on a tangible, non-transitory, machine-readable medium, such that when instructions in the code are read and executed by one or more processors, the operations and functionality described are effectuated. In some cases, the medium is distributed among a plurality of different computing devices, in a distributed application, and different subsets of the instructions are stored on different portions of the media and executed by different ones of the processors (a scenario included in references to "a medium").

In some embodiments, the process 100 begins with accessing sources of network activity log data having different external-namespace device identifiers, as indicated by block 102. There may be a variety of different sources of network activity log data. Examples include data reported by entities providing native applications on mobile computing devices and having access to the locations of those computing devices reported via network activity. Other examples include entities providing network access, such as cellular service providers and entities operating networks of wireless local network access points. Other examples include entities serving content to mobile computing devices, like advertising networks responding to requests for advertisements to insert into webpages or native applications, in some cases with those requests including a geolocation of the computing device to inform the selection. In some cases, the source may provide an application programming interface exposing a feed of the network activity log data, or the source may provide a batch of such data uploaded periodically. The data need not be pulled from a log, rather the term "log" indicates the data is of the sort that is logged, for example in server logs. The number of sources is expected to be relatively large and diverse, for example, some embodiments may receive data from more than 6 or 12 different sources, and in some cases more than 50.

In some cases, the different sources may provide this data in a different format from one another. In some cases, computing devices may be identified in the network activity log data according to an identifier assigned by a provider of an operating system of the computing device, like an identifier for advertising (IDFA) assigned by the iOS™ operating system or an Android™ advertising ID. In other cases, the provider of the data may anonymize the device identity by identifying the device with a cryptographic hash of various attributes of the device, like a hash of the device's MAC address and processor version.

In some cases, these external-namespace device identifiers may change, for instance, a user may request to change their device identifier, or any of these entities may periodically cycle device identifiers, for example by adding a random value that changes periodically to the input of the hash function. In some cases, these changes may occur every few months for a subset of the devices. In some cases, a given data source provides multiple device identifiers, and in some cases, the same external namespace is used by a subset of the data sources, for instance, 3 of 12 data sources may use the device identifier provided by the operating system, while others may use a bespoke cryptographic hash function to calculate an external-namespace device identifier.

The namespace of these external device identifiers is the set of valid device identifiers for that respective namespace and the rules by which identifiers are assigned. For example, a relatively simple namespace may assign device identifiers according to a four digit code that counts from 0000 to 9999 with each new device added to the system. In practice, the design of these namespaces is much more complex and includes design considerations like managing privacy, accommodating hundreds of millions of devices with unique respective identifiers, efficiency of encoding of identifiers for network transmission and storage, and in some cases imparting semantic content to the identifier, like with a prefix that indicates an attribute of the device, such as its operating system. Different data providers often arrive at different namespaces given their differing goals and design choices, and in some cases different data providers often intentionally choose different name spaces to encourage more concentrated usage of their system.

In some cases, the network activity log data may include a plurality of records, for example a stream of records, with each record indicating an instance of network activity by a given computing device. In some cases, the record may include an external-namespace device identifier, a timestamp, a geolocation sensed by the computing device (or otherwise obtained), and an indication of the information exchanged over the network or other aspects of user behavior. As noted, these records may stream at a relatively high rate, for example, at a rate higher than 500 to 2000 per second, in some cases for each source of network activity log data, and batch processes may operate on sources of network activity log data including more than 1 billion records spanning more than one month of trailing duration of time.

Next, from the accessed sources of network activity log data, some embodiments may obtain a network transaction record having an external-namespace device identifier, as indicated by block 104. In some cases, these obtained records may be obtained as part of the above-described feeds, for example, asynchronously from a plurality of different data sources.

Next, some embodiments may select an external-namespace-specific mapping based on the external namespace of the obtained record, as indicated by block 106. In some cases, the selection may include identifying a source of the network activity log data containing the obtained record, and selecting the external-namespace-specific mapping from among a plurality of such mappings based on the identity of the source. Examples of such mappings are described below with reference to FIG. 7. In some cases, each source or each external namespace may have a corresponding external-namespace-specific mapping. In some cases, these mappings may associate external-namespace identifiers within a specific external namespace with internal-namespace device identifiers. In some cases, the internal namespace may be a namespace used by the geolocation analytics system to distinguish computing devices from one another and to identify data related to the same computing device. In some cases, the external-namespace-specific mappings may be configured to provide relatively low latency access to internal-namespace device identifiers mapped to a given external-namespace device identifier. For example, some embodiments may implement a variant of the hash tables, binary trees, or prefix trees described below. That said, not all embodiments provide these benefits, as various independently useful techniques are described herein.

In some cases, the selection may occur before obtaining the network transaction record. For example, some embodiments may establish a connection to the external-namespace-specific mapping before accessing the sources of network activity log data that correspond to that mapping.

The mappings may associate individual external-namespace device identifiers with one or more internal-namespace device identifiers. In some cases, a given internal-namespace device identifier may appear in multiple external-namespace-specific mappings, as that computing device may have different identifiers used by the different sources of network activity log data. Further, because information about the correct mappings may change over time, and that information may only pertain to a subset of the external-namespace device identifiers, in some cases, different external-namespace device identifiers may be mapped to different, but partially overlapping sets of internal-namespace device identifiers in the different external-namespace-specific mappings.

Next, some embodiments may determine a hash value based on the external-namespace device identifier, as indicated by block 108. Hash functions generally generate a fixed length output from an input, where each part of the input contributes to the output, even if the input is substantially longer than the input, e.g., like in an MD5 hash or SHA-256 hash.

In some cases, the hash value may be the output of a hash function configured to output values in a range of an index of the external-namespace specific mapping that was selected. For example, the external-namespace-specific mapping may include an associative array accessed by index values they correspond to hash function outputs. The array may include, for example, reserved memory for one or more internal-namespace device identifiers at sequential index values of the array, for instance, ranging from an array index of zero up to an array index of 10 million. Individual values of the array may be accessed by requesting a value at an index position of the array, for example, a request for the value at index position 100,256 of the array may return a set of five internal-namespace device identifiers mapped to a corresponding external-namespace device identifier. Thus, the output of the hash function may serve as a key, in the form of an index of the array, that is paired with a value, in the form of a collection of internal-namespace device identifiers mapped to the index, the key, and the external-namespace device identifier that hashes to the index/key. A variety of different hash functions may be used, for example threshold amount of less significant digits serving as the hash output.

One advantage of this technique is that access times are relatively low for relatively large collections of data. Rather than iterating through each of the entries in the array to identify an entry corresponding to a an external-namespace device identifier obtained in the network transaction record (which in the above example may include as many as 10 million iterations, each having associated memory access requests and responses), some embodiments may perform a single iteration that directly accesses the desired collection of internal-namespace device identifiers (e.g., access in the form of reading or writing).

In some cases, other data structures faster than iterated searches may be used to expedite access. In some cases, keyvalue pairs of the external-namespace device identifiers and one or more internal-namespace device identifiers may be arranged in a sorted list, sorted by the external-namespace device identifiers, and records may be accessed with a binary search. In another example, the internal-namespace device identifiers may be arranged and accessed through a tree data structure in which different portions of the tree correspond to different portions of the external-namespace device identifier, like in a prefix tree or in a binary tree, like a balanced binary tree. For instance, a most significant digit of the external-namespace device identifier encoded in binary format may correspond to a root of the tree, and depending upon whether that value is one or zero, the tree may branch to another set of notes that correspond to the second most significant digit, which may then branch according to the third most significant digit, with leaf nodes corresponding to mappings to sets of internal-namespace device identifiers. Some embodiments may perform a recursive traversal of the tree to access a record of internal-namespace device identifiers.

Next, some embodiments include accessing a graph of internal-namespace device identifiers at an index of an associative array equal to the hash value, as indicated by block 110. In some cases, the plurality of internal-namespace device identifiers are arranged with metadata indicating information about those internal-namespace device identifiers, and in some cases relationships therebetween. In some cases, those relationships are in the form of a graph having nodes corresponding to internal namespace to this identifiers and edges indicating versioning relationships between those identifiers, for instance, indicating that one device identifiers supersedes another or was later determined to be a more reliable or more convenient indicator of the information indicated by the previous one. In some cases, these relationships may branch, for example, indicating that two internal-namespace device identifiers likely correspond to a single older one. In some cases, these relationships may merge, for example, indicating that two internal-namespace device identifiers were later consolidated. In some cases, the relationships do not indicate versioning information (which is not to suggest that any other feature described herein is not also amenable to variation), but rather merely indicate that the internal-namespace device identifiers are related to the same external-namespace device identifier.

In some cases, these relationships may be accessed when determining which internal-namespace device identifier to use. For instance, a query may be received requesting data pertaining to a particular duration of time and current internal-namespace device identifier. Embodiments may crawl backward through the graph of device identifiers to identify records relating to older versions, in some cases, selecting those records associated with an older internal-namespace device identifier in use at the particular duration of time.

It should be noted that data structures referenced herein need not be labeled with the same name in program code to serve as an instance of those data structures. For example, graphs may be encoded in a variety of different formats, including data structures explicitly labeled as graphs, as well as in matrices, relational databases, hierarchical serialized data format documents, and the like. Similarly, hash tables need not be explicitly labeled in program code is a hash table, if the underlying functionality of a hash table is present, and the same is true of the above-described trees and sorted lists.

Next, some embodiments may include determining whether the graph of internal-namespace device identifier satisfies filter criteria, as indicated by block 112. In some cases, the filter criteria may be criteria indicative of whether the collection of internal-namespace device identifiers are likely valid mappings to the corresponding external-namespace device identifier. For example, filter criteria may include a threshold count of internal-namespace device identifiers, with a count of internal-namespace device identifiers exceeding the threshold being deemed unreliable, and indicating that the mapping should be filtered from results. For example, a network activity data provider may have a default external-namespace device identifier applied to otherwise unidentified computing devices, and that default external-namespace device identifier may have several hundred or several thousand internal-namespace device identifiers mapped to thereto in an unreliable mapping.

In another example, the filter criteria may compare mappings in multiple external-namespace-specific mappings to detect inconsistent mappings. For example, a given internal-namespace device identifier may be mapped to an external-namespace device identifier corresponding to a first operating system in a first external-namespace-specific mapping, and that same internal-namespace device identifier may be mapped to another external-namespace device identifier corresponding to a second, different operating system in a second, different external-namespace-specific mapping. The likelihood of a computing device changing operating systems is often relatively low, so one or both of these mappings may be filtered from results of an access request as unreliable.

In another example, internal-namespace device identifiers may be associated with a reliability score indicating a likelihood that the corresponding mapping is correct. In some cases, this reliability score may be based on the strength of matches described above with reference to block 84 of FIG. 5, e.g., a half-life aged amount of corroborating records confirming the mapping. Those mappings having less than a threshold reliability score may be filtered from access requests (e.g., omitted).

Next, some embodiments may update one or more profiles associated with the internal-namespace device identifiers that were accessed in block 110 and not filtered from results in block 112, as indicated by block 114. In some cases, updating the profiles may include updating a profile of a place or of a person (which may be a profile of a person having multiple devices associated thereto, or maybe a profile of a device, with one person potentially having multiple device profiles). In some cases, the updating may include updating one or more of the above-described attribute scores based on a geolocation in the obtained network transaction record in block 104, as described elsewhere herein. In some cases, the profile may be identified by, and selected according to, for example uniquely, an internal-namespace device identifier. Thus, in some cases, multiple profiles may be updated corresponding to multiple internal-namespace device identifiers that were accessed and passed the filters.

In some cases, blocks 106 through 112 may serve other objectives beyond enriching profiles. For example, the same operations may be performed in responding to a query to read values based on a supplied external-namespace device identifier. For instance, some embodiments may receive a query from a party accessing the geolocation analytics platform to obtain information about a given mobile computing device (like when responding to an ad request from that mobile computing device), and that query may include an external-namespace device identifier (which may not include an internal-namespace device identifier, and which for at least some of the external namespaces is different from the internal-namespace device identifier). Some embodiments may execute the operations of blocks 106 through 112 to obtain one or more internal-namespace device identifiers, and then with those identifiers access one or more profiles associated thereto to provide a response to the query, for example, including some or all of the profile or an analysis based on the profile in the response. In some cases, these responses may be provided relatively quickly, as many of these types of queries are often relatively latency sensitive, for example, within less than 200 ms, and in some cases within less than 50 ms, in order to respond to a bid opportunity for a mobile advertisement within the bid opportunity window. Again, the data structures described above that afford relatively fast access are expected to facilitate these response times (though again, embodiments are not limited to systems that provide these benefits, as various independently useful inventive techniques are described).

Figure 7:
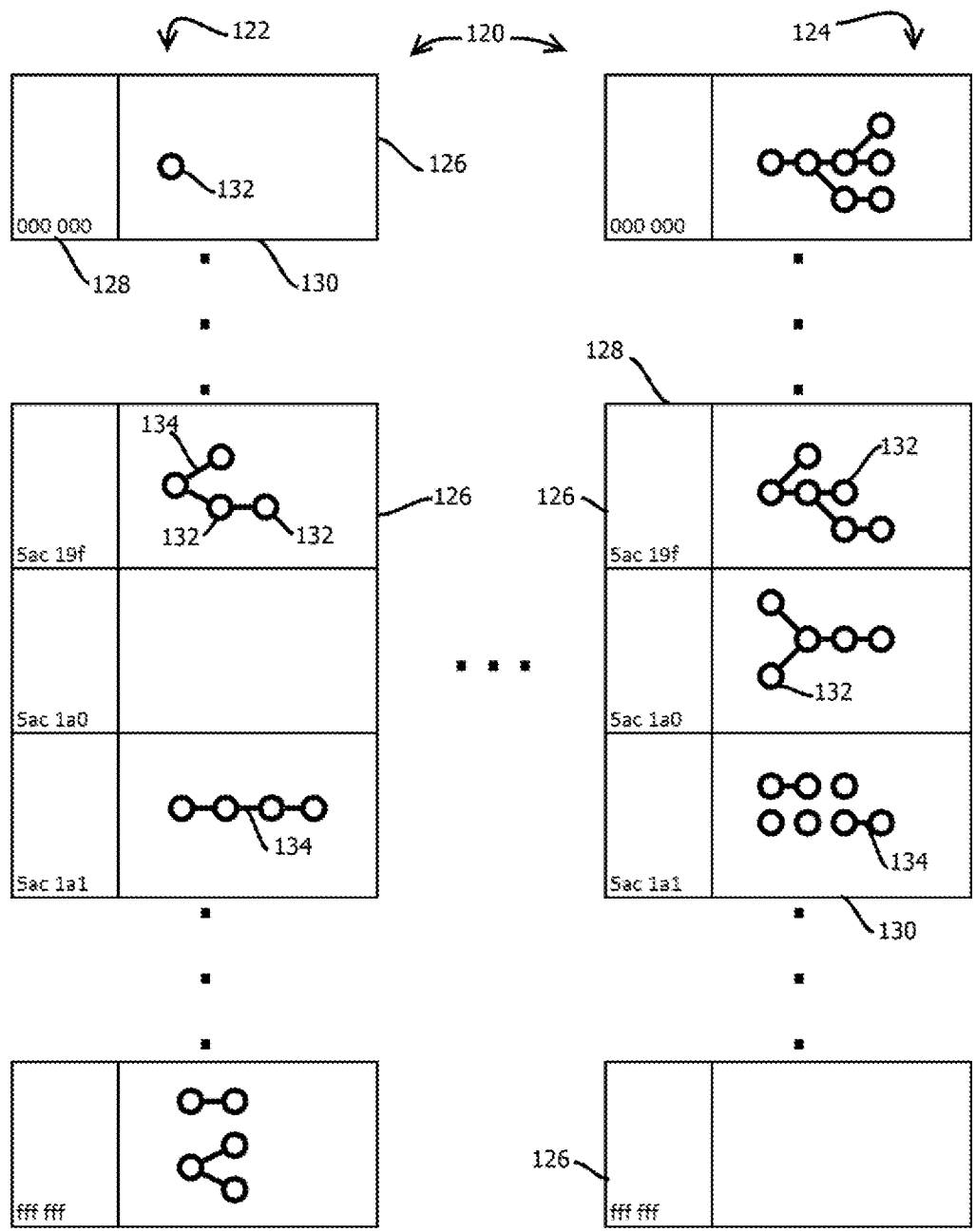
FIG. 7 shows an example of a data structure upon which the process of FIG. 6 operates.

FIG. 7 shows an example of a data structure upon which the process of FIG. 6 may operate. FIG. 7 illustrates an example of a multi-namespace mapping 120. In some embodiments, the multi-namespace mapping 120 may include a plurality of external-namespace-specific mappings 122 and 124 (with two shown, but embodiments are expected to include substantially more, for example 12 or more). The selection of block 106 may include selecting among these examples.

Each of the external-namespace-specific mappings 122 and 124 may include a plurality of keyvalue pairs 126. In the illustrated arrangement, the keyvalue pairs take the form of an associative array, with index values 128 serving as the keys, and array values 130 serving as the values of the keyvalue pairs. As discussed above, in some cases, the index values 128 may be values in a range of outputs of a hash function that takes as an input a corresponding external-namespace device identifier and outputs an index value of the array, in this example ranging from 000 000 to fff fff, and hexadecimal, but commercial embodiments may be even larger.

As illustrated, the associative array may reserve memory in with the operating system for each potential output of the hash function, in some cases regardless of whether any external-namespace device identifier in fact yields a hash function output corresponding to that index value. Thus, some of the indices of the associative array may be empty. Similarly, in some cases, hash collisions may occur where two external-namespace identifiers hash to the same value, in which case a record may be added to the corresponding position in the associative array indicating the collision and subdividing the internal-namespace device identifiers with separate mappings to the separate external-namespace device identifiers that collide.

In this example, the internal-namespace device identifiers are represented by reference number 132, and relationships therebetween are represented by reference number 134. As illustrated, a variety of different relationships therebetween may be represented. Further, each of the nodes 132 may have various metadata, like the above-described reliability scores, and in some cases timestamps indicating ages of the identifiers since they were added to the system. In some cases, each of the circles corresponds to an internal-namespace device identifier (like a 10 digit value from a counter that increments each time a new devices detected by the geolocation analytics system, a hash of one of the external-namespace device identifiers, or a selection of one of the external-namespace device identifiers from among a plurality of such identifiers probabilistically determined to be likely associated with a given device). As discussed above, a variety of other types of data structures may be used to encode the mappings, including binary trees, prefix trees, and sorted lists.

In some cases, the process of FIG. 6 and data structure FIG. 7 may be implemented an updated with a computing architecture for handing a real-time data feed. The computing architecture may be designed to operate at relatively large scale and low latency. The architecture may include a message broker described below, that communicates with a distributed processing system described below, to access and updates records in an in-memory database described below.

In some cases, a feed of network activity log data may be received by a message broker configured to handle real-time data feeds, for instance with a distributed transaction log, like with Apache Kafka™. Some embodiments may executing the message processing system on a cluster of servers. In some cases, messages may be arranged in topics of messages, with each message having a key, a value, and a timestamp. In some cases, each topic may be stored in a partitioned log that has an ordered immutable sequence of records to which the servers append new records in the topic, e.g., with a sequential id number within the partition. In some cases, the partitions may be distributed among multiple servers to accommodate larger data sets than a single server can support, and in some cases, the partitions may be replicated across servers (e.g., partially for fully) to support fault tolerance (i.e., continued operation even when one server fails in the cluster). In some cases, the servers managing a partition may designate one server as a leader and others as followers, where the leader server may manage read and write requests for the partition, and the followers replicate the partition. The followers may select a new leader upon failure of the existing leader to provide fault tolerance, a feature that becomes increasing important as computing tasks are distributed over larger collections of computing devices. In some cases, downstream computing processes, called consumers, may be arranged in groups and may subscribe by topic, and messages may be routed to different ones (e.g., in round robin fashion) of the members of the consumer group, thereby providing some load balancing for concurrent downstream processing. In some cases, the operations of obtaining network activity records may be performed with this architecture.

The message processing system may assign tasks to a fault tolerant, concurrent processing system, like Apache Spark™, which may access records in a extensible no sequel database to update records in the data structure FIG. 7 and access and update various user profiles with relatively low latency. Again, the processing system may include concurrently operating processes, distributed over a relatively large number of computing devices (e.g., more than 10) with fault-tolerant data structures. In some cases, received messages and intermediate results may be stored in a resilient distributed dataset (RDD) that replicates the data across computing devices in the form of an immutable collection of objects. Each RDD may have a plurality of partitions into which data pertaining to device mappings are arranged. In some cases, the RDDs having intermediate data results may be accessed in a sequence of operations, as part of a distributed shared memory, (e.g., for the various filter criteria) without committing the data to disk or serializing the data, which may slow computations. In some cases, a cluster manager process may coordinate operations that effectuate other portions of the process of FIG. 6.

In some cases, the output of updates may be stored in a non-relational (i.e., non-tabular) database, like a NoSQL database configured to provide low-latency response to queries focused on relationships between devices and places, for instance with an Aerospike database. In some cases, the database is an in-memory database that replicates data across multiple computing devices for fault tolerance. In some cases, queries may be serviced by accessing the database in main memory (rather than on disk), which often provides several orders of magnitude faster response times. In some cases, persistent records in flash storage may be updated to match the in-memory version.

Figure 8:
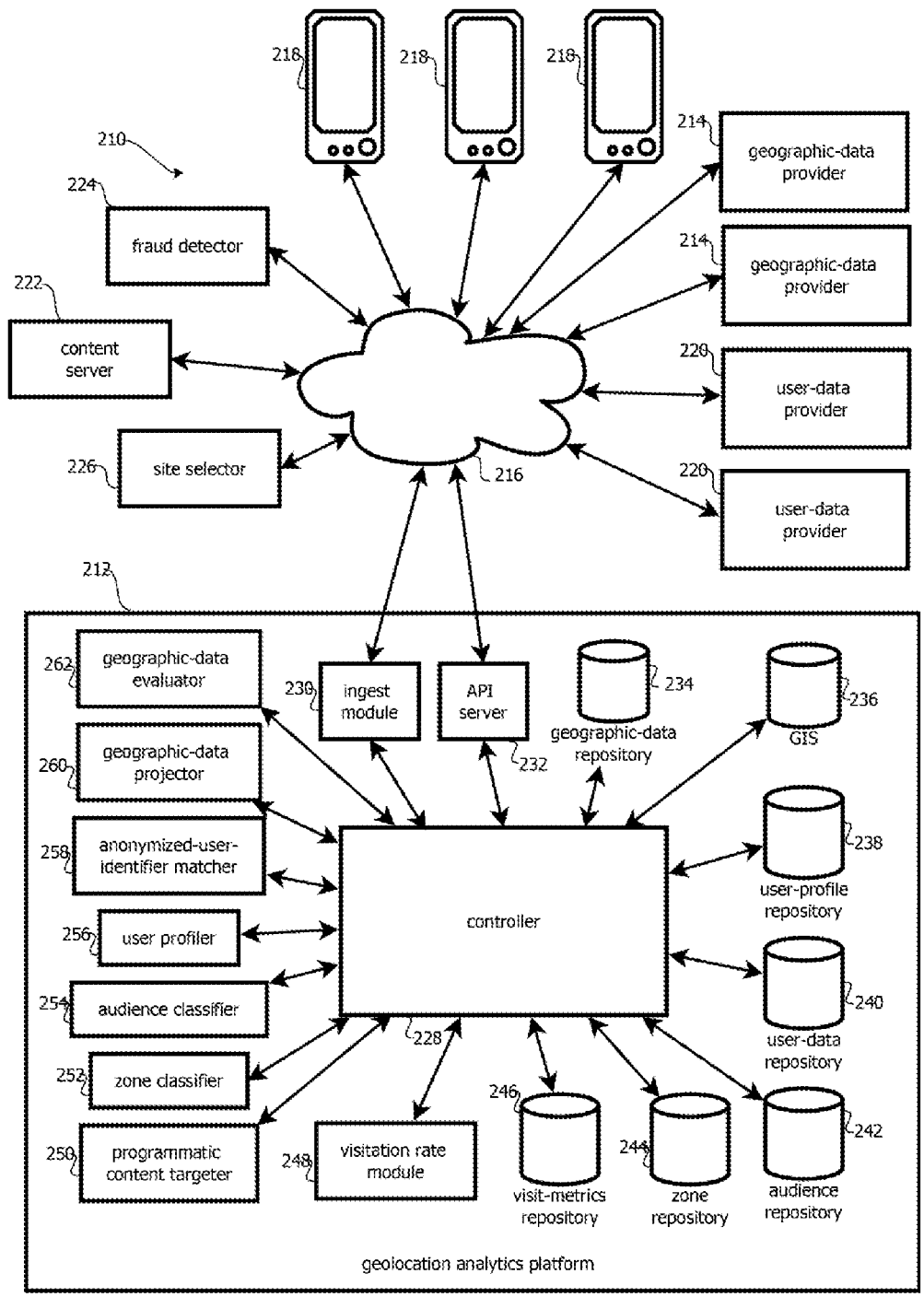
FIG. 8 shows an example of an environment in which a user profiler operates in accordance with some embodiments.

In some embodiments, the above techniques may operate on the system of FIG. 8, which illustrates a computing environment 210 having an example geolocation analytics platform 212. Embodiments of the geolocation analytics platform 212 may be implemented with one or more of the computing devices described below with reference to FIG. 9, e.g., by processors executing instructions stored in the below-described memory for providing the functionality described herein. FIG. 8 shows a functional block diagram of an example of the geolocation analytics platform 212. While the functionality is shown organized in discrete functional blocks for purposes of explaining the software and hardware by which the geolocation analytics platform 212 may be implemented in some embodiments, is important to note that such hardware and software may be intermingled, conjoined, subdivided, replicated, or otherwise differently arranged relative to the illustrated functional blocks. Due to the size of some geographic data sets (which may be as large as 100 billion content requests or geolocations, or larger, in some use cases), some embodiments may include a plurality of instances of the geolocation analytics platform 212 operating concurrently to evaluate data in parallel and some embodiments may include multiple instances of computing devices instantiating multiple instances of some or all of the components of the geolocation analytics platform 212, depending on cost and time constraints.

The geolocation analytics platform 212 may be understood in view of the exemplary computing environment 210 in which it operates. As shown in FIG. 8, the computing environment 210 further includes a plurality of geographic-data providers 214, the Internet 216, a plurality of mobile user devices 218, a plurality of user-data providers 220, a content server 222, a fraud detector 224, and a site selector 226. While a relatively small number of the above-described components are illustrated, it should be understood that embodiments are consistent with, and likely to include, substantially more of each component, such as dozens of geographic-data providers 214 and user data providers 220, hundreds of fraud detectors 224, content servers 222, and site selectors 226, and millions or tens of millions of user mobile devices 218. Each of these components may communicate with the geolocation analytics platform 212 or one another via the Internet 216. Some such communications may be used to either provide data by which audiences are classified according to geolocation history and other parameters, and some embodiments may use classified audiences for various purposes, such as serving content, detecting financial fraud, selecting real-estate sites, or the like. The components of the computing environment 210 may connect to one another through the Internet 216 and, in some cases, via various other networks, such as cellular networks, local area networks, wireless area networks, personal area networks, and the like.

FIG. 1 shows three geographic-data providers 214, but again, embodiments are consistent with substantially more instances, for example, numbering in the hundreds of thousands. The geographic-data providers 214 are shown as network connected devices, for example, servers hosting application program interfaces (APIs) by which geographic data is requested by the geolocation analytics platform 212, or in webpages from which such data is retrieved or otherwise extracted. It should be noted, however, that in some cases the geographic data may be provided by other modes of transport. For instance, hard-disk drives, optical media, flash drives, or other memory may be shipped by physical mail and copied via a local area network to on-board memory accessible to the geolocation analytics platform 212. In some cases, the geographic data is acquired in batches, for example, periodically, such as daily, weekly, monthly, or yearly, but embodiments are consistent with continuous (e.g., real-time) data feeds as well. Thus in some cases, the geographic-data providers 214 may provide geolocation histories that are non-contemporaneous (relative to when they are acquired) and span a relatively large period of time, such as several hours, several weeks, or several months in the past.

In many cases, the entity operating the geolocation analytics platform 212 does not have control over the quality or accuracy of the provided geographic data, as that data is often provided by a third-party, for instance, sellers of geocoded advertising inventory, the data being provided in the form of ad request logs from various publishers. For instance, the geographic-data providers 214 may be mobile website publishers, retargeting services, and providers of mobile device applications, or native apps. In some cases, the geographic data comprehensively canvasses a large geographic region, for example, every zip code, county, province, or state within a country, or the geographic data may be specific to a particular area, for example, within a single province or state for data gathered by local government or local businesses. Publishers acting as the provider of the geographic data may be an entity with geocoded advertising inventory to sell, e.g., ad impressions up for auction (e.g., logged over time) that are associated with a geographic location at which the entity represents the ad will be presented. In some cases, pricing for such advertising inventory is a function, in part, of the quality and accuracy of the associated geographic locations.

In some cases, the geographic-data providers 214 may provide location history data (e.g., from the mobile devices 218), such as ad request logs indicating, for instance, a plurality of requests for advertisements from publishers (e.g., operators of various websites or mobile device native applications), each request being for an advertisements to be served at a geolocation specified in the request. The geographic location specified in a given request may be used by an advertiser to determine whether to bid on or purchase the right to supply the requested advertisement, and the amount an advertiser wishes to pay may depend on the accuracy and quality of the identified geolocation. These location history records may contain a plurality of such requests, each having a geolocation (e.g., a latitude coordinate and a longitude coordinate specifying where a requested ad will be served), a unique identifier such as a mobile device ID (e.g., a device identifier of a end user device 18 upon which the ad will be shown) and a timestamp. In some cases, the device identifier may be a Unique Device Identifier (UDID) or an advertiser or advertising specific identifier, such as an advertising ID.

In FIG. 8, three mobile user devices 218 are illustrated, but it should be understood that embodiments are consistent with (and most use cases entail) substantially more user devices, e.g., more than 100,000 or more than one million user devices. The illustrated user devices 218 may be mobile handheld user devices, such as smart phones, tablets, or the like, having a portable power supply (e.g., a battery) and a wireless connection, for example, a cellular or a wireless area network interface, or wearable user devices, like smart watches and head-mounted displays. Examples of computing devices that, in some cases, are mobile devices are described below with reference to FIG. 9. User devices 218, however, are not limited to handheld mobile devices, and may include desktop computers, laptops, vehicle in-dash computing systems, living room set-top boxes, and public kiosks having computer interfaces. In some cases, the user devices 18 number in the millions or hundreds of millions and are geographically distributed, for example, over an entire country or the planet.

Each user devices 218 may include a processor and memory storing an operating system and various special-purpose applications, such as a browser by which webpages and advertisements are presented, or special-purpose native applications, such as weather applications, games, social-networking applications, shopping applications, and the like. In some cases, the user devices 218 include a location sensor, such as a global positioning system (GPS) sensor (or GLONASS, Galileo, or Compass sensor) or other components by which geographic location is obtained, for instance, based on the current wireless environment of the mobile device, like SSIDs of nearby wireless base stations, or identifiers of cellular towers in range. In some cases, the geographic locations sensed by the user devices 218 may be reported to the content server 222 for selecting content based on location to be shown on the mobile devices 218, and in some cases, location histories (e.g., a sequence of timestamps and geographic location coordinates) are acquired by the geographic-data providers 220, which may include content providers. In other cases, geographic locations are inferred by, for instance, an IP address through which a given device 218 communicates via the Internet 216, which may be a less accurate measure than GPS-determined locations. Or in some cases, geographic location is determined based on a cell tower to which a device 218 is wirelessly connected. Depending on how the geographic data is acquired and subsequently processed, that data may have better or less reliable quality and accuracy.

In some use cases, the number of people in a particular geographic area at a particular time as indicated by such location histories may be used to update records in the geolocation analytics platform 212. Location histories may be acquired by batch, e.g., from application program interfaces (APIs) of third-party providers, like cellular-network operators, advertising networks, or providers of mobile applications. Batch formatted location histories are often more readily available than real-time locations, while still being adequate for characterizing longer term trends in geographic data. And some embodiments may acquire some locations in real time (e.g., within 2 seconds of a request), for instance, for selecting content (like an advertisement, review, article, or business listing) to be displayed based on the current location.

The user-data providers 220 may provide data about users that is not necessarily tied to geolocation, such as purchasing history, media viewing history, automotive records, social networking activity, and the like. In some cases, user-data providers 220 include credit card processors, banks, cable companies, or television rating services. In some embodiments, user-data providers include microblogging services, location check-in services, or various other social networks. In some cases, audience classification according to geolocation may be supplemented with such data, for instance, according to the appearance of various keywords in social network posts, linkages between users indicated by social networks, or patterns in buying or reviewing behavior. In some cases, various features may be extracted from such data and included in the analysis described below for identifying audiences. In some cases, the techniques described in U.S. Provisional Patent Application 62/244,768, filed 22 Oct. 2015, titled DETECTING INFLUENCERS IN SOCIAL NETWORKS WITH LOCATION DATA, may be executed by the illustrated system to detect influencers and target content to them.

The illustrated content server 222 is operative to receive a request for content, select content (e.g., images and text), and send the content for display or other presentation to a user. One content server 222 is shown, but embodiments are consistent with substantially more, for example, numbering in the thousands. In some cases, the content is advertisements and advertisements are selected or bid upon with a price selected based on the geographic location of a computing device upon which an advertisement will be shown, which may be indicated by one of the geographic-data providers/content servers, or such entities may also be a publisher selling the advertising inventory. Accordingly, the accuracy and quality of such geographic data may be of relevance to the parties selling or buying such advertising space. The selection or pricing of advertisements may also depend on other factors. For example, advertisers may specify a certain bid amount based on the attributes of the geographic area documented in the geolocation analytics platform 212, or the advertiser may apply various thresholds, requiring certain attributes before an advertisement served, to target advertisements appropriately.

Some embodiments include a fraud detector 224 which may include an automated process run by a financial institution that detects anomalous behavior indicative of fraud based, in part, on correlations (or lack thereof) between financial transactions and patterns identified by the geolocation analytics platform 212. For instance, in some embodiments, the fraud detector 224 may submit a query to the geolocation analytics platform 212 based on a financial transaction, such as the purchase of a particular type of automobile, and the geolocation analytics platform 212 may respond with an audience classification of the user. In some embodiments the fraud detector 224 may determine whether the user who engaged in the financial transaction is likely to be a member of the audience for such purchases based on the data provided by the geolocation analytics platform 212. For example, a user who is not a member of an audience in Austin, Tex. that is present in Austin golf courses regularly, upon purchasing a set of golf clubs, may trigger a fraud alert, when the fraud detector receives a report for the geolocation analytics platform 212 that the user is not a member of an Austin, Tex., golf-playing audience. In some cases, the fraud detector may maintain an ontology of types of financial transactions and audiences associated with those transactions. Upon receiving a record of a financial transaction, the fraud detector may query audiences corresponding to the user, the location, and the time of the transaction, and determine whether the responsive audiences match those associated with the type of financial transaction in the ontology. Fraud may be detected based on the absence of such matches.

In some embodiments, the site selector 226 may categorize geographic areas as appropriate sites for various activities, such as positioning stores, allocating government resources, or distributing content into various zones based on geolocations frequented by audiences identified by the geolocation analytics platform 212. For instance, the site selector 226 may submit a request for zones in which members of a particular audience are present during lunch time and position restaurants in those zones.

In some embodiments, the geolocation analytics platform 212 may include a controller 228 that directs the activity of and routes data between the various components of the geolocation analytics platform 212. In some cases, the functionality of the controller may be divided into various processes, such as a separate controller for ingesting data, cleaning and normalizing data, classifying audiences and zones, targeting content, and evaluating the success of such targeting in driving visitation to various geographic locations. In some embodiments, activities other than programmatic content targeting may be performed as batch processes at times scheduled by the controller 228, such as daily or hourly, non-contemporaneously with when such data is used, to facility faster responses when the pre-processed data is used.

Some embodiments may include an ingest module 230 operative to retrieve data from the geographic-data providers 214 and user-data providers 220 via various APIs of such services. In some cases, such data may be routed by the controller 228 to a geographic data evaluator 262, examples of which are described in U.S. patent application Ser. No. 14/553,422, which is incorporated by reference in its entirety. The geographic-data evaluator may evaluate the quality of geographic data by geographic data provider and detect suspect, low-quality geographic data. Data from such providers with a history of providing low-quality data may be rejected from, or down-weighted in, the analyses described below, or such data providers may be stored with corresponding scores for purposes of bidding on the opportunity to serve advertisements or other content via such providers, for instance, in response to a content request for a website hosted by such a geographic-data provider.

Some embodiments may include an application program interface server 232, which may receive requests for information about audiences and geographic locations from the various entities operating devices 222, 224, and 226. In some cases, this may include requests by a third party content targeter for audiences corresponding to a current user device, at a current geolocation, requesting content at a current time (e.g., within the previous two seconds or so). In some cases, responsive data may include a list of audiences corresponding to these inputs or a list of scores for a plurality of audiences indicative of how well those inputs correspond to those audiences. In other examples, the request may include a request for an inventory of geographic areas corresponding to a specified audience, such as geographic areas or categories of places frequented by mobile device users who also frequent a given store or category of stores.

Some embodiments may include a geographic-data repository 234. The geographic-data repository 234, in some embodiments, stores geographic data from the geographic-data providers 214 and associated quality profiles of the geographic data, including measures of geographic data quality and accuracy provided by the geographic-data evaluator 262. In some embodiments, content providers, such as advertisers, or publishers, or others interested in the quality of geographic data from a given data provider 214 may query the geographic-data repository 234 for information output by the geographic-data evaluator 262.

Some embodiments may include a geographic information system 236. The geographic information system 236 may be configured to provide information about geographic locations in response to queries specifying a location or attribute of interest (or combinations thereof). In some embodiments, the geographic information system (GIS) 236 organizes information about a geographic area by quantizing (or otherwise dividing) the geographic area into area units, called tiles, that are mapped to subsets of the geographic area. In some cases, the tiles correspond to square units of area having sides that are between 10-meters and 1000-meters, for example, approximately 100-meters per side, depending upon the desired granularity with which a geographic area is to be described. Tiles are, however, not limited to square-shaped tiles, and may include other tilings, such as a hexagonal tiling, a triangular tiling, or other regular tilings (e.g., for simpler processing), semi-regular tilings, or irregular tilings (e.g., for describing higher density areas with higher resolution tiles, while conserving memory with larger tiles representing less dense areas). In some cases, such tilings may facilitate relatively fast access to data, such as in-memory data structures responsive to queries without retrieving data from a hard disk, though embodiments are not limited to systems that provide this benefit, which is not to suggest that any other feature described herein may also be omitted in some embodiments.

In some cases, polygons corresponding to businesses and other places, points corresponding to points of interest, and lines corresponding to roads, railroad tracks, and the like may also be stored in the geographic information system 36 as geographic features. In some cases, attributes of tiles overlapping such features may be mapped to these features, e.g., in proportion to the amount of area of a tile occupied by the corresponding feature and as a weighted combination of multiple tiles in which such a feature may be disposed, for instance, with such weights being proportional to the amount area of the feature in each respective tile. In some cases, the described attributes of the tiles may be mapped directly to the features, e.g., with a record for each such a feature, or subset of such a feature, like a floor of a store, or aisle of a store, with the features grouped according to the tile in which they are disposed for relatively fast searching of features by first retrieving a group of features in a single tile. To simplify the mapping, in some cases, irregular tiles may correspond to the boundaries of features.

In some cases, the attributes of a geographic area change over time. Accordingly, some embodiments divide each tile (or feature, if characterized separately, for example) according to time. For instance, some embodiments divide each tile into subsets of some duration of time, such as one week, one month, or one year, and attributes of the tile are recorded for subsets of that period of time. For example, the period of time may be one week, and each tile may be divided by portions of the week selected in view of the way users generally organize their week, accounting, for instance, for differences between work days and weekends, work hours, after work hours, mealtimes, typical sleep hours, and the like. Examples of such time divisions may include a duration for a tile corresponding to Monday morning from 6 AM to 8 AM, during which users often eat breakfast and commute to work, 8 AM till 11 AM, during which users often are at work, 11 AM till 1 PM, during which users are often eating lunch, 1 PM till 5 PM, during which users are often engaged in work, 5 PM till 6 PM, during which users are often commuting home, and the like. Similar durations may be selected for weekend days, for example 8 PM till midnight on Saturdays, during which users are often engaged in leisure activities. In some cases the divisions of time are logically connected but are disjoint, for instance, morning and evening commute times may be classified in a single category of time corresponding to commuting. Each of these durations may be profiled at each tile.

In some embodiments, the geographic information system 236 includes a plurality of tile (or feature, if separately tracked) records, each such record corresponding to a different subset of a geographic area. Each tile (or feature) record may include an identifier, an indication of geographic area corresponding to the tile (which for regularly sized tiles may be the identifier from which location can be calculated or may be a polygon with latitude and longitude vertices, for instance), and a plurality of tile-time records. Each tile-time record may correspond to one of the above-mentioned divisions of time for a given tile, and the tile-time records may characterize attributes of the tile at different points of time, such as during different times of the week. Each tile-time (or feature-time) record may also include a density score indicative of the number of people in the tile at a given time. In some embodiments, each tile-time record includes an indication of the duration of time described by the record (e.g., lunch time on Sundays, or dinnertime on Wednesdays) and a plurality of attribute records, each attribute record describing an attribute of the tile at the corresponding window of time during some cycle (e.g., weekly). Some embodiments may include seasonal variants of such time designations, e.g., a set of time categories for the Christmas season, a set for Summer, and a set for the remainder of the year, constituting a type of time-tile record called a time-tile-season record.

The attributes may be descriptions of activities in which users (e.g., of third party services that provide data to the geolocation analytics platform 212) engage that are potentially of interest to advertisers or others interested in geographic data about human activities and attributes (e.g., geodemographic data or geopsychographic data). For example, some advertisers may be interested in when and where users go to particular types of restaurants, when and where users play golf, when and where users watch sports, when and where users fish, or when and where users work in particular categories of jobs. In some embodiments, each tile-time record may include a relatively large number of attribute records, for example, more than 10, more than 100, more than 1000, or approximately 4000 attribute records, depending upon the desired specificity with which the tiles are to be described. Each attribute record may include an indicator of the attribute being characterized and an attribute score indicating the degree to which users tend to engage in activities corresponding to the attribute in the corresponding tile at the corresponding duration of time. In some cases, the attribute score (or tile-time record) is characterized by a density score indicating the number of users expected to engage in the corresponding activity in the tile at the time. In some cases, attributes may be organized in a hierarchical ontology, for instance, businesses→retail→convenience_stores, or demographic→suburbanite→young_professional.

Thus, to use some embodiments of the geographic information system 236, a query may be submitted to determine what sort of activities users engage in at a particular block in downtown New York during Friday evenings, and the geographic information system 236 may respond with the attribute records corresponding to that block at that time. Those attribute records may indicate a relatively high attribute score for high-end dining, indicating that users typically go to restaurants in this category at that time in this place, and a relatively low attribute score for playing golf, for example. Or a query may request tiles or features for which a given attribute score is exhibited. Attribute scores may be normalized, for example, a value from 0 to 10, with a value indicating the propensity of users to exhibit behavior described by that attribute. In some cases, scoring attributes according to a discrete set of normalized values may facilitate use of in-memory data structures that provide relatively fast access to information, though embodiments are not limited to systems that provide this benefit, which is not to suggest that any other feature described herein may also be omitted in some embodiments. Further, the attribute scores may be pre-calculated before such scores are used in an analysis, as some forms of analysis are relatively latency sensitive, such as content selection, which users are expected prefer to have happen within less than 500 milliseconds, while calculating attribute scores may take substantially longer.

In some cases, the user-profile repository 238 may store profiles of users of mobile devices 218 that are based on a user's geolocation history and in some cases data from user-data providers 220. In some cases, these user profiles may be created by a user profiler 256, an example of which is described in U.S. Pat. No. 8,489,596, the entire contents of which are incorporated by reference. The user profiler 256 may join the location histories of user devices corresponding to a user and tile records implicated by locations in those location histories to generate user profiles. Thus, users may be characterized according to the attributes of the places those users visit at the time the user visits those places. The generated user profiles may then be stored by the user profiler 256 in the user-profile repository 238.

The illustrated user-profile repository 238 includes a plurality of user-profile records, each record corresponding to the profile of a given user or a given mobile device 218, e.g., based on device mappings described above with profiles associated with one or more internal-namespace device identifiers. A user may have multiple profiles, one per device, or a single profile, e.g., with multiple devices. Each user-profile record may include an identifier of the record (which may be a value otherwise uncorrelated with the identity of the user to enhance privacy), and an identifier of the source or sources of the location histories from which the profile was created such that subsequent location histories can be matched with the profile (e.g. a account associated with a special-purpose native application, a cell phone number, or some other value, which may be hashed to enhance user privacy).

Each user-profile record may also include a plurality of profile time (or profile-time-season) records indicating attributes of the user profile at different times during some cycle of time (e.g., portions of the week or month, or during other periods like those described above with reference to the geographic information system 236). In some cases, the profile-time records may correspond to the same durations of time as those of the time-tile records described above. Each profile-time record may include an indication of the duration of time being described (e.g. Thursdays at dinnertime, or Saturday midmorning) and a plurality of profile attribute records, each profile attribute record indicating the propensity of the corresponding user to engage in an activity, or exhibit a property, described by the attribute during the corresponding time of the profile-time record. The profile time records may allow tracking of when users tend to engage in a given activity (e.g., time of day, day of week, week of year). In some embodiments, the profile attribute records correspond to the same set of attribute records described above with reference to the geographic information system 236. Each profile-attribute record may include an indication of the attribute being characterized (e.g., attending a children's soccer game, having brunch at a fast-casual dining establishment, parent running errands, or shopping at a mall) and a score indicating the propensity of the user to engage in the activity at the corresponding time, such as a normalized value from 0 to 10. The attribute records may further include a sample size, indicative of the number of samples upon which the attribute score is based, for weighting new samples, and a measure of variance among these samples (e.g., a standard deviation) for identifying outliers.

As described below, the user-profile records may be used for a variety of purposes. For example, publishers operating content server 222 may submit to the geolocation analytics platform 212 a query identifying one of the user-profile records, such as a hashed value of a user account number or phone number, and the geolocation analytics platform 212 may respond with the attributes of the corresponding user at the current time. In some embodiments, to further enhance user privacy, queries may be submitted for a specific attribute to determine whether to serve content corresponding to the attribute, or a query may request a binary indication of whether the attribute score is above a threshold.

In another example, the user-profile repository 238 may be used by the user profiler 256 to augment the records in the geographic information system 236. For example, an index may be created for each attribute that identifies tiles where users having relatively strong scores (e.g. above a threshold) for the respective attribute tend to co-occur at given times. These indices may correspond to heat maps (though no visual representation need be created) indicating where, for example, users interested in golf tend to be during various times of the day, such that content-providers can select content based on this information, or related services may be positioned nearby. In some embodiments, an index may be created for each user attribute at each of the above-described divisions of time in the geographic information system 236, and these indices may be queried to provide relatively prompt responses relating to where users having a given attribute or combination of attributes tend to co-occur at various times. Precalculating the indices is expected to yield faster responses to such queries than generating responsive data at the time the query is received. For instance, using examples of these indices relating to fishing and employment in banking, an advertiser may determine that people who engage in fishing on the weekend and work in banking tend to drive relatively frequently along a particular stretch of road on Mondays during the evening commute, and that advertiser may purchase an advertisement for bass fishing boats as a source of relaxation for bankers on a billboard along that road in response.

In some cases, user profiles may be supplemented with data from the user-data providers 220. In some embodiments, a user-data repository 240 may store such data as it is acquired for further analysis. Further, in some embodiments, the quality of data from such data providers may be scored, and such scores may be associated with identifiers of the providers in the user-data repository 240. In some embodiments, this data may be down-weighted or rejected based on indicators of low-quality.

Some embodiments may include an audience repository 240 storing records by which audience membership may be determined. These records, in some cases may be created and accessed by an audience classifier 254. In some cases, audience membership is pre-calculated before a query is received, for example, for each recognize query within some parameter space, for instance, for every type of attribute record, pair of attribute records, or attribute record combined with larger geolocation area, like weekend golfers in the state of Texas. In some cases, parameters of models by which audience membership is determined may be stored in the audience repository 242, for example, learned parameters that are pre-calculated according to training sets. In some cases, an audience membership vector may be calculated based on a given geographic location, a given user identifier (e.g., a device identifier), and given time, with each component of the vector indicating membership in a corresponding audience. In some cases, membership may be binary, or some embodiments may score membership, for example from 0 to 10 depending on the probability of membership in the corresponding audience given the inputs. In some cases, each component of the audience vector may be calculated according to an audience member function that is a combination (e.g., weighted sum) of feature functions. Examples of such feature functions may include scores indicating whether a given user is currently within a tile having a particular attribute score (or collection of attribute scores) above a threshold, whether a given user has visited tiles having a particular attribute score above a threshold at particular times more than a threshold amount of times within some trailing duration, and the like. In some cases, a collection of audience vectors for each user may be stored in the respective user profile, e.g., as a sparse matrix having rows or columns indexed according to times and geolocations at which the corresponding audience vector applies. In some cases, identifying feature functions with predictive value can be relatively challenging given the relatively large, high-dimensional search space of candidate feature functions in many commercially relevant implementations.

Some embodiments may include a zone repository 244, which may include zone records populated by a zone classifier 252. Zones may be geographic areas associated with audiences. For example, some embodiments may identify geographic areas that students at a local university tend to visit, with the corresponding audience being likely students at a given university or collection of universities, or those who are regularly at such universities (e.g., more than a threshold amount of times in a trailing duration of time). In some cases, the zone repository may include zone records that list tiles or time tiles likely to be visited by members of particular audiences. In some cases, zones may be classified according to an amount of mutual information between of events corresponding to audience membership and members of those audiences visiting particular tiles. In some cases, the mutual information may be calculated in terms of a conditional entropy, and tiles having the highest mutual information (for example, greater than a threshold amount of tiles, like a threshold percentage) may be selected for consideration as members of the zone for that audience.

In some cases, the selected candidate tiles may be clustered and resulting clusters may be designated as zones. Some embodiments may execute a density-based clustering algorithm, like DBSCAN, to establish groups corresponding to the resulting clusters and exclude outliers. Some embodiments may examine each of the geolocations reflected in the records and designate a tile as a core tile if at least a threshold amount of the other tiles in the records are within a threshold geographic distance or number of tiles. Some embodiments may then iterate through each of the tiles and create a graph of reachable geolocations, where nodes on the graph are identified in response to non-core corresponding tiles being within a threshold distance of a core tile in the graph, and in response to core tiles in the graph being reachable by other core tiles in the graph, where two tiles are reachable from one another if there is a path from one tile to the other tile where every link and the path is a core tile and the tiles in the link are within a threshold distance of one another. The set of nodes in each resulting graph, in some embodiments, may be designated as a cluster, and points excluded from the graphs may be designated as outliers that do not correspond to clusters. Outliers may be excluded from zones in some cases.

Some embodiments may include a visit-metrics repository 246 having records created by a visitation rate module 248. In some cases, the records may indicate the degree to which content targeted to particular users succeeded in driving those users to visit a targeted geographic location, for example, records indicating whether an advertisement targeted to users in a particular neighborhood succeeded in driving those users to visit a particular store. In some cases, the visitation rate module 248 may include the visitation rate module of U.S. patent application Ser. No. 13/769,736, the entire contents of which are incorporated by reference. In some cases, visitation rates may be adjusted to account for undercounting of undetected people, for example, those not employing cell phones while in the targeted location or employing cell phones that are not detectable, for instance, due to lack of signal quality for a particular type of handset or carrier. In some cases, such undercounting may correlate with various attributes of the user, including the user's mobile device, and some embodiments may adjust detected visitation rates to account for such undercounting. Some embodiments may measure a marginal increase in an amount of visits to a target geographic location likely to be attributable to targeted content. For example, some embodiments may identify audience members, serve targeted content to some of the audience members (e.g., a treatment group), and compare visitation amounts (e.g., calculate a statistically significant amount of difference between) between those audience members that receive the targeted content and those that did not (e.g., a control group of the audience) to determine a marginal increase attributable to the targeted content. Feedback from such measurements may be used to tune audience classification algorithms or select among audiences, e.g., dynamically unselecting audiences for which a response fails to satisfy a visitation threshold. That said, not all embodiments necessarily provide these benefits, which is not to suggest that any other feature may not also be omitted in some cases.

Some embodiments may include a programmatic content targeter 250. In some cases, this module may automatically determine whether to provide content and which content to provide, in some cases at the time of the content request, based on classification of audiences or zones. In some embodiments, the programmatic content targeter 250 may programmatically determine audience membership and determine a bidding amount for submitting a bid to an online auction to provide an advertisement to a given user. To facilitate relatively fast responses to such time sensitive requests, some embodiments may pre-calculate zone classifications and audience classifications and index those classifications according to parameters of a content request (e.g., according to key values based on (such as hash values of) one or more of a device or user identifier, a geographic location, and a category of time corresponding to the time tile records). In some cases, bidding may be real-time, e.g., within less than 500 milliseconds of when an ad is requested, and often even sooner. In other cases, advertising space may be pre-purchased programmatically before ad requests, e.g., based on expected audience behavior in the coming hours or days. In other cases, other types of content may be programmatically targeted, e.g., business listings or articles based on audience membership. Programmatic targeting based on audience classification is expected to reduce labor costs relative to manual tuning and targeting of content. That said, not all embodiments necessarily provide these benefits, which is not to suggest that any other feature may not also be omitted in some cases.

Some embodiments may include an anonymized-user-identifier matcher 258, examples of which are described above (e.g., with FIGS. 4-5 corresponding to one set of examples and FIGS. 6-7 corresponding to another set, which is not to imply the two approaches may not be used in combination, which is another set of contemplated examples) and in U.S. patent application Ser. No. 14/334, 066, the entire contents of which are incorporated by reference. In some cases, a user may switch mobile devices or be reassigned a device identifier. Re-creating a user profile for that user based on the new identifier can be time-consuming and particularly difficult at commercially-relevant scales. Accordingly, some embodiments of the matcher 258 may detect matches between geolocation patterns of a new user identifier and an old user identifier to assign that new identifier to an existing user profile when such matches are detected. This is expected to yield more accurate classifications of audiences based on more complete data for individuals using two different devices. That said, not all embodiments necessarily provide these benefits, which is not to suggest that any other feature may not also be omitted in some cases.

Some embodiments may further include a geographic-data projector 260, an example of which is described in U.S. patent application Ser. No. 13/938,974, the entire contents of which are incorporated by reference. In some cases, geographic-data providers may provide data at a relatively low resolution, e.g., census data reported at the zip code level. Some embodiments may un-evenly project such values onto higher-resolution geographic areas (e.g., some instances of the tile records or corresponding geographic features) within the low-resolution area based on a distribution of a population within that larger geographic area. Accordingly, some embodiments may enrich the records of the geographic information system 236 by which audiences and zones are identified with information that would otherwise be inapplicable or inaccurately applied. That said, not all embodiments necessarily provide these benefits, which is not to suggest that any other feature may not also be omitted in some cases.

The profiles may characterize a variety of attributes of users. In one illustrative use case, a location history may indicate that a user frequently visits geographic locations associated with tourism, and the profile of that user may be updated to indicate that the user frequently engages in tourism, which may be of interest to certain categories of advertisers. Or a user may spend their working hours in geographic areas associated with childcare and residences, and based on their location history, the profile of that user may be updated to indicate that the user likely engages in childcare for children younger than school age. Other examples are described below.

Further, as explained in detail below, the attributes associated with geographic locations may vary over time (for example, an area with coffee shops and bars may have a stronger association with consumption of breakfast or coffee in the morning, an association which weakens in the evening, while an association with entertainment or nightlife may be weaker in the morning and stronger in the evening). User profiles may be generated in accordance with the time-based attributes that predominate when the user is in a geographic area. And in some embodiments, user profiles may also be segmented in time, such that a portion of a given user's profile associated with a weekday morning may have different attributes than another portion of that user's profile associated with a weekend night, for instance.

The user profiles may be used by advertisers and others in a privacy-friendly fashion, such that users are expected to tend to opt in to sharing their location history. For example, the user profiles may be aggregated to identify geographic areas having a high density of a particular type of user at a particular time of the week, such as a sports stadium having a relatively large number of users associated with fishing as a hobby, or a children's soccer field in which a relatively large number of people associated with golfing as a hobby might tend to co-occur on weekend mornings. Such correlations may be presented to advertisers or others without disclosing information by which individual users can be uniquely identified. In other applications, user-specific information may be provided, for example, users who opt in to sharing their profiles may receive user-specific services or communications formulated based on the individual profile of that user.

Accounting for time when characterizing geographic areas is believed to yield relatively accurate characterizations of places, as the activities that people engage in at a given location tend to depend strongly on time of day and week. And for similar reasons, accounting for time when profiling users is expected to yield relatively accurate characterizations of the users. Generating profiles based on location history further offers the benefit of profiling users without imposing the burden of manually doing so on the users themselves, and using attributes of geographic areas in which the user travels is expected to yield relatively privacy-friendly data about the user. That said, not all embodiments offer all, or any, of these benefits, as various engineering and cost trade-offs are envisioned, and other embodiments may offer other benefits, some of which are described below.

As noted above, the user profiler 212 obtains data from the mobile devices 216 and the geographic information system 218 to output user profiles to the user-profile datastore 214 for use by the ad servers 222 or for other purposes. Accordingly, these components are described in this sequence, starting with inputs, and concluding with outputs.

The mobile devices 216 maybe any of a variety of different types of computing devices having an energy storage device (e.g., a battery) and being capable of communicating via a network, for example via a wireless area network or a cellular network connected to the Internet 220. In some cases, the mobile devices 216 are handheld mobile computing devices, such as smart phones, tablets, or the like, or the mobile devices may be laptop computers or other special-purpose computing devices, such as an automobile-based computer (e.g., an in-dash navigation system). The mobile devices 216 may have a processor and a tangible, non-transitory machine-readable memory storing instructions that provide the functionality described herein when executed by the processor. The memory may store instructions for an operating system, special-purpose applications (apps), and a web browser, depending upon the use case. It should be noted, however, that the present techniques are not limited to mobile devices, and other computing devices subject to geolocation may also generate data useful for forming user profiles. For instance, set-top boxes, gaming consoles, or Internet-capable televisions may be geolocated based on IP address, and data from user interactions with these devices may be used to update user profiles, e.g., with user interaction indicating a time at which a user was at the geolocation corresponding to the device.

This software may have access to external or internal services by which the location of the mobile device may be obtained. For example, the mobile device may have a built-in satellite-based geolocation device (for instance a global-positioning system, or GPS, device or components operative to obtain location from other satellite-based systems, such as Russia's GLONASS system or the European Union's Galileo system). In another example, location may be obtained based on the current wireless environment of the mobile device, for example by sensing attributes of the wireless environment (e.g. SSIDs of wireless hotspots, identifiers of cellular towers and signal strengths, identifiers of low energy Bluetooth beacons, and the like) and sending those attributes to a remote server capable of identifying the location of the mobile device. In some embodiments, the location may be obtained based on an identifier of a network node through which the mobile device connects to the Internet, for example by geocoding an IP address of a wireless router or based on a location of a cellular tower to which the mobile device is connected. The location may be expressed as a latitude and longitude coordinate or an area, and in some cases may include a confidence score, such as a radius or bounding box defining area within which the device is expected to be with more than some threshold confidence.

From time to time, the location of the mobile devices 216 may be obtained by the mobile devices. For example, when a user interacts with a special-purpose application, in some cases, the application may have permission to obtain the location of the mobile device and report that location to a third party server associated with the application, such that the location may be obtained by the user profiler 212 from the third party server. In another example, the user may visit a website having code that obtains the current location of the mobile device. This location may be reported back to the server from which the website was obtained or some other third party server, such as an ad server for an affiliate network, and location histories may be obtained from this server. In another example, locations of the mobile devices 216 may be obtained without the participation of the mobile device beyond connecting to a network. For instance, users may opt in to allowing a cellular service provider to detect their location based on cellular signals and provide that location to the user profiler 212. Depending upon how location is obtained, the location may be acquired intermittently, for example at three different times during a day when a user launches a particular application, or relatively frequently, for example by periodically polling a GPS device and reporting the location. In some cases, the location history may include locations obtained more than one-second apart, more than one-minute apart, more than one-hour apart, or more, depending upon the use case.

Locations may be obtained in real time from mobile devices 216 by the user profiler 212, or in some embodiments, location histories may be obtained, e.g., from third party data providers. Each location history may include records of geographic locations of a given mobile device and when the mobile device was at each location. In some cases, a location history may include records of location over a relatively long duration of time, such as more than over a preceding hour, day, week, or month, as some modes of acquiring location histories report or update location histories relatively infrequently. A location history for a given mobile device may include a plurality (e.g., more than 10 or more than 100) location records, each location record corresponding to a detected location of the mobile device, and each location record including a geographic location and the time at which the mobile device was at the location. The location records may also include a confidence score indicative of the accuracy of the detected location. Geographic locations may be expressed in a variety of formats with varying degrees of specificity, for example as a latitude and longitude coordinates, as tiles in a grid with which a geographic area is segmented (e.g., quantized), or in some other format for uniquely specifying places.

The geographic information system 218 may be configured to provide information about geographic locations in response to queries specifying a location of interest. In some embodiments, the geographic information system 218 organizes information about a geographic area by quantizing (or otherwise dividing) the geographic area into area units, called tiles, that are mapped to subsets of the geographic area. In some cases, the tiles correspond to square units of area having sides that are between 10-meters and 1000-meters, for example approximately 100-meters per side, depending upon the desired granularity with which a geographic area is to be described. In other examples, the tiles have other shapes, e.g., hexagon shapes that are arranged in a two-dimensional hexagonal packing layout.

In some cases, the attributes of a geographic area change over time. Accordingly, some embodiments divide each tile according to time. For instance, some embodiments divide each tile into subsets of some period of time, such as one week, one month, or one year, and attributes of the tile are recorded for subsets of that period of time. For example, the period of time may be one week, and each tile may be divided by portions of the week selected in view of the way users generally organize their week, accounting, for instance, for differences between work days and weekends, work hours, after work hours, mealtimes, typical sleep hours, and the like. Examples of such time divisions may include a duration for a tile corresponding to Monday morning from 6 AM to 8 AM, during which users often eat breakfast and commute to work, 8 AM till 11 AM, during which users often are at work, 11 AM till 1 PM, during which users are often eating lunch, 1 PM till 5 PM, during which users are often engaged in work, 5 PM till 6 PM, during which users are often commuting home, and the like. Similar durations may be selected for weekend days, for example 8 PM till midnight on Saturdays, during which users are often engaged in leisure activities. Each of these durations may be profiled at each tile.

In some embodiments, the geographic information system 218 includes a plurality of tile records, each tile record corresponding to a different subset of a geographic area. Each tile record may include an identifier, an indication of geographic area corresponding to the tile (which for regularly size tiles may be the identifier), and a plurality of tile-time records. Each tile-time record may correspond to one of the above-mentioned divisions of time for a given tile, and the tile-time records may characterize attributes of the tile at different points of time, such as during different times of the week. Each tile-time record may also include a density score indicative of the number of people in the tile at a given time. In some embodiments, each tile-time record includes an indication of the duration of time described by the record (e.g. lunch time on Sundays, or dinnertime on Wednesdays) and a plurality of attribute records, each attribute record describing an attribute of the tile at the corresponding window of time during some cycle (e.g., weekly).

The attributes may be descriptions of activities in which users engage that are potentially of interest to consumers of the user-profile datastore 214. For example, some advertisers may be interested in when and where users go to particular types of restaurants, when and where users play golf, when and where users watch sports, when and where users fish, or when and where users work in particular categories of jobs. In some embodiments, each tile-time record may include a relatively large number of attribute records, for example more than 10, more than 100, more than 1000, or approximately 4000 attribute records, depending upon the desired specificity with which the tiles are to be described. Each attribute record may include an indicator of the attribute being characterized and an attribute score indicating the degree to which users tend to engage in activities corresponding to the attribute in the corresponding tile at the corresponding duration of time. In some cases, the attribute score (or tile-time record) is characterized by a density score indicating the number of users expected to engage in the corresponding activity in the tile at the time.

Thus, to use some embodiments of the geographic information system 218, a query may be submitted to determine what sort of activities users engage in at a particular block in downtown New York during Friday evenings, and the geographic information system 218 may respond with the attribute records corresponding to that block at that time. Those attribute records may indicate a relatively high attribute score for high-end dining, indicating that users typically go to restaurants in this category at that time in this place, and a relatively low attribute score for playing golf, for example. Attribute scores may be normalized, for example a value from 0 to 10, with a value indicating the propensity of users to exhibit behavior described by that attribute.

The user profiler 212 may join the location histories and tile records implicated by locations in those location histories to generate user profiles. Thus, users may be characterized according to the attributes of the places those users visit at the time the user visits those places. The generated user profiles may then be stored by the user profiler 212 in the user-profile datastore 214, as described below. To this end, or others, some embodiments of the user profiler 212 includes a location-history acquisition module 224, a location-attribute acquisition module 226, and a user-attribute updater 228 operative to generate user profiles.

The user profiler 212 may be constructed from one or more of the computers described below with reference to FIG. 9. These computers may include a tangible, non-transitory, machine-readable medium, such as various forms of memory storing instructions that when executed by one or more processors of these computers (or some other data processing apparatus) cause the computers to provide the functionality of the user profiler 212 described herein. The components of the user profiler 212 are illustrated as discrete functional blocks, but it should be noted that the hardware and software by which these functional blocks are implemented may be differently organized, for example, code or hardware for providing the this functionality may be intermingled, subdivided, conjoined, or otherwise differently arranged.

The illustrated location-history acquisition module 224 may be configured to acquire location histories of mobile devices 216 via the Internet 220. The location histories may be acquired directly from the mobile devices 216, or the location histories may be acquired from various third parties, such as a third-party hosting Web applications rendered on the mobile devices 216, third parties hosting servers to which location histories are communicated by apps on the mobile devices 216, or third parties providing network access to the mobile devices 216, such as cellular service providers, for example. The location-history acquisition module 224 may include a plurality of sub-modules for obtaining location histories from a plurality of different providers. These sub-modules may be configured to request, download, and parse location histories from a respective one of the different providers via application program interfaces provided by those providers. The sub-modules may normalize the location histories from the different providers, which may be in different formats, into a common format for use in subsequent processing. Location histories may be acquired periodically, for example monthly, weekly, or hourly, or more frequently.

The user profiler 212 of this embodiment further includes the location-attribute acquisition module 226. The module 226 may be configured to obtain attributes of locations identified based on the location histories acquired by the location history acquisition module 224. For example, the module 226 may be configured to iterate through each location identified by each location history and query the geographic information system 18 for attributes of those locations at the time at which the user was at the corresponding location. In some cases, the location-attribute acquisition module 226 may also request attributes of adjacent locations, such as adjacent tiles, from the geographic information system 218 so that the user-attribute updater 228 can determine whether a signal from a given tile is consistent with that of surrounding tiles for assessing the reliability of various indications.

The acquired location histories and location attributes may be provided by modules 224 and 226 to the user-attribute updater 228, which in some embodiments, is configured to generate user profiles based on this data. In some cases, the user-attribute updater 228 is operative to attach attributes of places visited by users to the profile of those users. These profiles may be stored by the user attribute updater 228 in the user-profile datastore 214.

The user profile datastore 214 may be operative to store user profiles and, in some embodiments, address queries for data in the user profiles. The illustrated user-profile datastore 214 includes a plurality of user-profile records, each record corresponding to the profile of a given user or a given mobile device 216. Each user-profile record may include an identifier of the record (which may be a value otherwise uncorrelated with the identity of the user to enhance privacy), and an identifier of the source or sources of the location histories from which the profile was created such that subsequent location histories can be matched with the profile (e.g. a account associated with a special-purpose application, a cell phone number, or some other value, which may be hashed to enhance user privacy).

Each user-profile record may also include a plurality of profile time records indicating attributes of the user profile at different times during some cycle of time (e.g., portions of the week or month, or during other periods like those described above with reference to the geographic information system 218). In some cases, the profile-time records may correspond to the same durations of time as those of the time-tile records described above. Each profile-time record may include an indication of the duration of time being described (e.g. Thursday's at dinnertime, or Saturday mid-morning) and a plurality of profile attribute records, each profile attribute record indicating the propensity of the corresponding user to engage in an activity described by the attribute during the corresponding time of the profile-time record. The profile time records may allow tracking of when users tend to engage in a given activity (time of day, day of week, week of year). In some embodiments, the profile attribute records correspond to the same set of attribute records described above with reference to the geographic information system 218. Each profile-attribute record may include an indication of the attribute being characterized (e.g., attending a children's soccer game, having brunch at a fast-casual dining establishment, parent running errands, or shopping at a mall) and a score indicating the propensity of the user to engage in the activity at the corresponding time, such as a normalized value from 0 to 10. The attribute records may further include a sample size, indicative of the number of samples upon which the attribute score is based, for weighting new samples, and a measure of variance among these samples (e.g., a standard deviation) for identifying outliers.

As described below, the user-profile records may be used for a variety of purposes. For example, advertisers operating ad servers 222 may submit to the user-profile datastore 214 a query identifying one of the user-profile records, such as the above-mentioned hashed value of a user account number or phone number, and the user-profile datastore 214 may respond with the attributes of the corresponding user at the current time. In some embodiments, to further enhance user privacy, queries may be submitted for a specific attribute to determine whether to serve an advertisement corresponding to the attribute, or a query may request a binary indication of whether the attribute score is above a threshold.

In another example, the user-profile datastore 214 may be used by the user profiler 212 to augment the records in the geographic information system 218. For example, an index may be created for each attribute that identifies tiles where users having relatively strong scores (e.g. above a threshold) for the respective attribute tend to co-occur at given times. These indices may correspond to heat maps (though no visual representation need be created) indicating where, for example, users interested in golf, tend to be during various times of the day, such that advertisers can select advertisements based on this information. In some embodiments, an index may be created for each user attribute at each of the above-described divisions of time in the geographic information system 218, and these indices may be queried to provide relatively prompt responses relating to where users having a given attribute or combination of attributes tend to co-occur at various times. Precalculating the indices is expected to yield faster responses to such queries than generating responsive data at the time the query is received. For instance, using examples of these indices relating to fishing and employment in banking, an advertiser may determine that people who engage in fishing on the weekend and work in banking tend to drive relatively frequently along a particular stretch of road on Mondays during the evening commute, and that advertiser may purchase an advertisement for bass fishing boats on a billboard along that road in response. Other examples relating to customization of software and services and other forms of analysis are described in greater detail below.

In short, some embodiments of the computing environment 210 generate user profiles that are relatively privacy-friendly to users and consume relatively little effort on the part of users or others to create the profiles. These advantages are expected to yield a relatively comprehensive set of relatively high-resolution user profiles that may be used by advertisers and others seeking to provide information and services customized to the unique attributes of each user, facilitating the presentation of high-value and high-relevance advertisements and services to users while respecting the users' interest in privacy. That said, not all embodiments provide these benefits, and some embodiments may forgo some or all of these embodiments in the interest of various engineering trade-offs relating to time, cost, and features.

Figure 9:
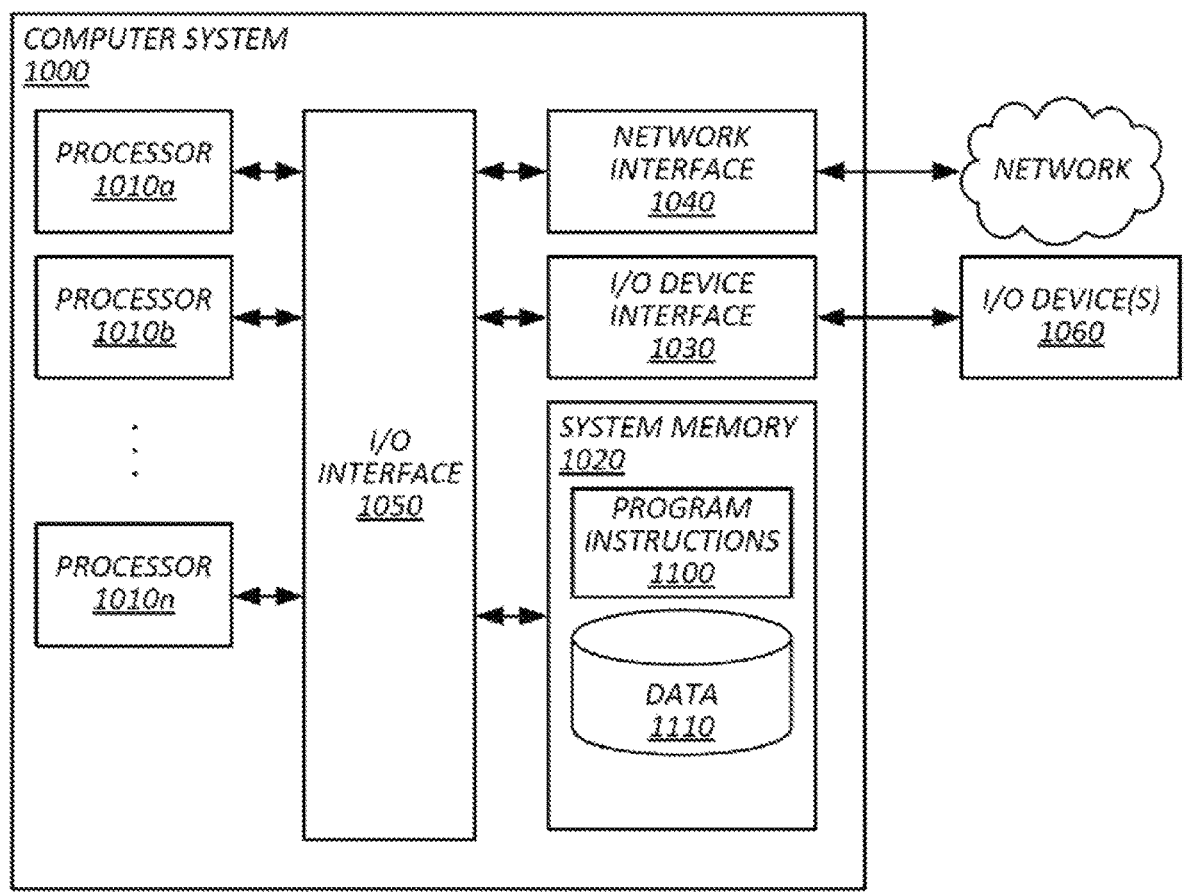
FIG. 9 shows an embodiment of a computer system by which the above-mentioned systems and processes may be implemented.

FIG. 9 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A method of joining data from feeds from multiple sources of computing device network activity data having heterogenous device identifier namespaces and device identifier to device mappings that change over time, the method comprising: accessing, with one or more processors, three or more sources of network activity log data from three or more different sources of network activity data, wherein: each source of network activity log data describes network activity by more than 100,000 mobile computing devices, each source of network activity log data describes activities over a duration of time longer than one hour, each source of network activity log data provides transaction records of more than one 1 million transactions by at least some of the mobile computing devices, each transaction record including one or more external-namespace device identifiers in an external namespace of a respective mobile computing device participating in the respective network transaction, and the transaction records associate geolocations reported by the mobile computing devices with timestamps and external-namespace device identifiers of the mobile computing devices; for each of the sources of network activity log data, based the respective network activity log data, updating, with one or more processors, a multi-namespace mapping that maps the external-namespace device identifiers to internal-namespace device identifiers in an internal namespace of a system configured to profile mobile computing devices based on logged network activity data of the mobile computing devices, wherein: the namespace mapping comprises a plurality of external-namespace-specific mappings each mapping a respective type of device identifier in a respective external namespace used in the network activity log data to one or more internal-namespace device identifiers, and at least some of the external-namespace device identifiers are mapped in at least some of the external-namespace-specific mappings to a plurality of internal-namespace device identifiers, with a given device external-namespace device identifier being mapped to a given plurality of internal-namespace device identifiers; after updating the multi-namespace mapping, receiving, with one or more processors, an external-namespace device identifier; selecting, with one or more processors, one of the external-namespace-specific mappings based on the external namespace of the received external-namespace device identifier; accessing, with one or more processors, a plurality of internal-namespace device identifiers mapped to the received external-namespace device identifier by the selected external-namespace-specific mapping; and accessing, with one or more processors, a device profile associated with at least some of the plurality internal-namespace device identifiers.

2. The method of embodiment 1, wherein updating the multi-namespace mapping comprises, for the given external-namespace device identifier: determining to add a new internal-namespace device identifier mapping to the given external-namespace device identifier; and adding the new internal-namespace device identifier as a new branch to a graph of the given plurality of internal-namespace device identifiers.

3. The method of embodiment 2, wherein the graph of the given plurality of device identifiers in the internal namespace comprises: three or more internal-namespace device identifiers; and edges indicating that some of the three or more internal-namespace device identifiers are newer versions of others of the three or more internal-namespace device identifiers.

4. The method of embodiment 2, wherein the graph is an acrylic graph and wherein nodes of the graph are associated with scores indicative of a likelihood that the corresponding internal-namespace device identifier is correctly assigned to the given external-namespace device identifier.

5. The method of any of embodiments 1-4, wherein each plurality of internal-namespace device identifiers mapped to a single external-namespace device identifier are associated with links between respective pairs of the internal-namespace device identifiers indicating relationships between the plurality of internal-namespace device identifiers.

6. The method of any of embodiments 1-5, wherein at least one of the external-namespace-specific mappings includes an associative array comprising key-value pairs, wherein: keys of the key-value pairs are outputs of a hash function upon taking as an input an external-namespace identifier; the keys of the key-value pairs are values in a sequential index of the associative array; and values of the key-value pairs are internal-namespace device identifiers mapped to the corresponding external-namespace identifier that yields a hash function output of the corresponding key.

7. The method of any of embodiments 1-6, wherein at least one of the external-namespace-specific mappings is a tree in which branches represent different portions of the corresponding external namespace and at least some nodes are mapped to internal-namespace device identifiers corresponding to the portions of the corresponding external namespace.

8. The method of any of embodiments 1-7, wherein: at least some internal-namespace device identifiers appear in a plurality of different external-namespace-specific mappings; and at least some of the external-namespace-specific mappings correspond to different mobile operating systems from one another.

9. The method of any of embodiments 1-8, wherein: updating the multi-namespace mapping comprises updating a subset of the multi-namespace mapping without re-calculating a different subset of the multi-namespace mapping.

10. The method of any of embodiments 1-9, wherein: internal-namespace device identifiers mapped to external-namespace device identifiers change over time; and wherein both mappings from the external-namespace device identifiers to older and newer internal-namespace identifiers are maintained in the multi-namespace mapping after the changes.

11. The method of any of embodiments 1-10, wherein the external namespaces comprise: identifiers for advertising assigned by a first operating system; and advertising identifiers assigned by a second operating system different from the first operating system.

12. The method of any of embodiments 1-11, wherein: the external namespaces include more than 6 different external namespaces, each of the different external namespaces including identifiers for devices that are represented in at least one of the other eternal namespace.

13. The method of any of embodiments 1-12, comprising: determining that the given plurality of internal-namespace device identifiers comprises more than a threshold amount of the device identifiers and, in response, omitting a corresponding mapping from responses to access request for the given external-namespace device identifier.

14. The method of any of embodiments 1-13, comprising: determining that another given internal-namespace device identifier is mapped in a given pair of external namespaces; determining that the given pair of external namespaces correspond to different operating systems and, in response, determining to not use at least one of the corresponding mappings.

15. The method of any of embodiments 1-14, wherein updating the multi-namespace mapping comprises steps for updating a multi-namespace mapping.

16. The method of any of embodiments 1-15, comprising: profiling one of the mobile computing devices based on geolocations associated in the transaction records with different external-namespace device identifiers and in the multi-namespace mapping with at least one of the same internal-namespace device identifiers; and storing a resulting profile in memory in association with one or more internal-namespace device identifiers of the one of the mobile computing devices.

17. The method of embodiment 16, comprising: sending a computing system configured to select content for delivery to mobile computing devices data indicative of the profile and one or more external-namespace device identifiers associated with the one of the mobile computing devices; receiving updated data from one of the sources of network activity log data from the computing system configured to select content for delivery to mobile computing devices; re-updating the multi-namespace mapping based on the updated data.

18. The method of embodiment 17, comprising: receiving the updated data with means for handling real-time data feeds; processing messages based on the updated data from the means for handling real-time data feeds with a compute cluster having means for concurrently processing the messages with fault tolerance; updating the profile with means for profiling users; and storing the updated profile in an in-memory, non-relational database.

19. The method of embodiment 18, comprising: receiving an ad request; responding to the ad request within less than 200 milliseconds of receiving the ad request by querying the profile in the in-memory, non-relational database and determining a response to the ad request based on query results.

20. A tangible, non-transitory, machine-readable medium storing instructions that when executed by a data processing apparatus cause the data processing apparatus to perform operations comprising: any of embodiments 1-19.

21. A system, comprising: one or more processors; and memory storing instructions that when executed by the processors cause the processors to effectuate operations comprising: any of embodiments 1-19.

What is claimed is:

1. A tangible, non-transitory, machine readable medium storing instructions that, when executed by a computer system, effectuate operations comprising:
    accessing, with a computer system, network activity log data from two or more different sources of network activity data, wherein:
        each source of network activity log data describes network activity by mobile computing devices,
        each source of network activity log data describes activities over a duration of time longer than one hour,
        each source of network activity log data provides transaction records of transactions by at least some of the mobile computing devices, each transaction record including one or more external-namespace device identifiers in an external namespace of a respective mobile computing device participating in the respective network transaction, and
        the transaction records associate geolocations reported by the mobile computing devices with timestamps and external-namespace device identifiers of the mobile computing devices;
    for each of the sources of network activity log data, based the respective network activity log data, updating, with one or more processors, a multi-namespace mapping that maps the external-namespace device identifiers to internal-namespace device identifiers in an internal namespace of a system configured to profile mobile computing devices based on geolocations in logged network activity data of the mobile computing devices, wherein:
        the namespace mapping comprises a plurality of external-namespace-specific mappings each mapping a respective type of device identifier in a respective external namespace used in the network activity log data to one or more internal-namespace device identifiers, and
        at least some of the external-namespace device identifiers are mapped in at least some of the external-namespace-specific mappings to a plurality of internal-namespace device identifiers, with a given device external-namespace device identifier being mapped to a given plurality of internal-namespace device identifiers;
    profiling one of the mobile computing devices based on geolocations associated in the transaction records with different external-namespace device identifiers and in the multi-namespace mapping with at least one of the same internal-namespace device identifiers; and
    storing a resulting profile in memory in association with one or more internal-namespace device identifiers of the one of the mobile computing devices.

2. The medium of claim 1, wherein updating the multi-namespace mapping comprises, for the given external-namespace device identifier:
    determining to add a new internal-namespace device identifier mapping to the given external-namespace device identifier; and
    adding the new internal-namespace device identifier as a new branch to a graph of the given plurality of internal-namespace device identifiers.

3. The medium of claim 2, wherein the graph of the given plurality of device identifiers in the internal namespace comprises:
    three or more internal-namespace device identifiers; and
    edges indicating that some of the three or more internal-namespace device identifiers are newer versions of others of the three or more internal-namespace device identifiers.

4. The medium of claim 2, wherein the graph is an acrylic graph and wherein nodes of the graph are associated with scores indicative of a likelihood that the corresponding internal-namespace device identifier is correctly assigned to the given external-namespace device identifier.

5. The medium of claim 1, wherein each plurality of internal-namespace device identifiers mapped to a single external-namespace device identifier are associated with links between respective pairs of the internal-namespace device identifiers indicating relationships between the plurality of internal-namespace device identifiers.

6. The medium of claim 1, wherein at least one of the external-namespace-specific mappings includes an associative array comprising key-value pairs, wherein:
    keys of the key-value pairs are outputs of a hash function upon taking as an input an external-namespace identifier;
    the keys of the key-value pairs are values in a sequential index of the associative array; and
    values of the key-value pairs are internal-namespace device identifiers mapped to the corresponding external-namespace identifier that yields a hash function output of the corresponding key.

7. The medium of claim 1, wherein at least one of the external-namespace-specific mappings is a tree in which branches represent different portions of the corresponding external namespace and at least some nodes are mapped to internal-namespace device identifiers corresponding to the portions of the corresponding external namespace.

8. The medium of claim 1, wherein:
at least some internal-namespace device identifiers appear in a plurality of different external-namespace-specific mappings; and
at least some of the external-namespace-specific mappings correspond to different mobile operating systems from one another.

9. The medium of claim 1, wherein:
updating the multi-namespace mapping comprises updating a subset of the multi-namespace mapping without re-calculating a different subset of the multi-namespace mapping.

10. The medium of claim 1, wherein:
internal-namespace device identifiers mapped to external-namespace device identifiers change over time; and
both mappings from the external-namespace device identifiers to older and newer internal-namespace identifiers are maintained in the multi-namespace mapping after the changes.

11. The medium of claim 1, wherein the external namespaces comprise:
identifiers for advertising assigned by a first operating system; and
advertising identifiers assigned by a second operating system different from the first operating system.

12. The medium of claim 1, wherein:
the external namespaces include more than 6 different external namespaces, each of the different external namespaces including identifiers for devices that are represented in at least one of the other eternal namespace.

13. The medium of claim 1, the operations further comprising:
determining that the given plurality of internal-namespace device identifiers comprises more than a threshold amount of the device identifiers and, in response, omitting a corresponding mapping from responses to access request for the given external-namespace device identifier.

14. The medium of claim 1, the operations further comprising:
determining that another given internal-namespace device identifier is mapped in a given pair of external namespaces; and
determining that the given pair of external namespaces correspond to different operating systems and, in response, determining to not use at least one of the corresponding mappings.

15. The medium of claim 1, wherein updating the multi-namespace mapping comprises steps for updating a multi-namespace mapping.

16. The medium of claim 1, the operations further comprising:
after updating the multi-namespace mapping, receiving an external-namespace device identifier;
selecting one of the external-namespace-specific mappings based on the external namespace of the received external-namespace device identifier;
accessing a plurality of internal-namespace device identifiers mapped to the received external-namespace device identifier by the selected external-namespace-specific mapping; and
accessing the profile based on the profile being associated with at least some of the plurality internal-namespace device identifiers.

17. The medium claim 1, the operations further comprising:
sending a computing system configured to select content for delivery to mobile computing devices data indicative of the profile and one or more external-namespace device identifiers associated with the one of the mobile computing devices;
receiving updated data from one of the sources of network activity log data from the computing system configured to select content for delivery to mobile computing devices; and
re-updating the multi-namespace mapping based on the updated data.

18. The medium of claim 17, the operations further comprising:
receiving the updated data with means for handling real-time data feeds;
processing messages based on the updated data from the means for handling real-time data feeds with a compute cluster having means for concurrently processing the messages with fault tolerance;
updating the profile with means for profiling users; and
storing the updated profile in an in-memory, non-relational database.

19. The medium of claim 18, the operations further comprising:
receiving an ad request; and
responding to the ad request within less than 200 milliseconds of receiving the ad request by querying the profile in the in-memory, non-relational database and determining a response to the ad request based on query results.

20. A system, comprising:
one or more processors; and
memory storing instructions that when executed by the processors cause the processors to effectuate operations comprising:
accessing network activity log data from three or more different sources of network activity data, wherein:
each source of network activity log data provides transaction records of transactions by mobile computing devices, each transaction record including one or more external-namespace device identifiers in an external namespace of a respective mobile computing device participating in the respective network transaction, and
the transaction records associate geolocations reported by the mobile computing devices with timestamps and external-namespace device identifiers of the mobile computing devices;
updating a multi-namespace mapping that maps the external-namespace device identifiers to internal-namespace device identifiers in an internal namespace of a system configured to profile mobile computing devices based on geolocations in logged network activity data of the mobile computing devices, wherein:
the namespace mapping comprises a plurality of external-namespace-specific mappings each mapping a respective type of device identifier in a respective external namespace used in the network activity log data to one or more internal-namespace device identifiers, and
at least some of the external-namespace device identifiers are mapped in at least some of the external-namespace-specific mappings to a plurality of internal-namespace device identifiers, with a given device external-namespace device identifier being mapped to a given plurality of internal-namespace device identifiers;

profiling one of the mobile computing devices based on geolocations associated in the transaction records with different external-namespace device identifiers and in the multi-namespace mapping with at least one of the same internal-namespace device identifiers; and storing a resulting profile in memory in association with one or more internal-namespace device identifiers of the one of the mobile computing devices.

21. A method, comprising:

accessing, with a computer system, network activity log data from two or more different sources of network activity data, wherein:

each source of network activity log data provides transaction records of transactions by mobile computing devices, each transaction record including one or more external-namespace device identifiers in an external namespace of a respective mobile computing device participating in the respective network transaction, and the transaction records associate geolocations reported by the mobile computing devices with timestamps and external-namespace device identifiers of the mobile computing devices;

updating, with the computer system, a multi-namespace mapping that maps the external-namespace device identifiers to internal-namespace device identifiers in an internal namespace, wherein:

the namespace mapping comprises a plurality of external-namespace-specific mappings each mapping a respective type of device identifier in a respective external namespace used in the network activity log data to one or more internal-namespace device identifiers, and at least some of the external-namespace device identifiers are mapped in at least some of the external-namespace-specific mappings to a plurality of internal-namespace device identifiers, with a given device external-namespace device identifier being mapped to a given plurality of internal-namespace device identifiers;

profiling, with the computer system, one of the mobile computing devices based on geolocations associated in the transaction records with different external-namespace device identifiers and in the multi-namespace mapping with at least one of the same internal-namespace device identifiers; and storing, with the computer system, a resulting profile in memory.

22. The method of claim 21, wherein profiling comprises steps for profiling.

23. The method of claim 21, comprising steps for matching non-canonical user identifiers.

* * * * *